US011836011B2

(12) United States Patent
Oh

(10) Patent No.: US 11,836,011 B2
(45) Date of Patent: Dec. 5, 2023

(54) FOLDABLE MULTIMEDIA TERMINAL

(71) Applicant: June Soo Oh, Seoul (KR)

(72) Inventor: June Soo Oh, Seoul (KR)

(*) Notice: Subject to any disclaimer, the term of this patent is extended or adjusted under 35 U.S.C. 154(b) by 42 days.

(21) Appl. No.: 17/276,434

(22) PCT Filed: Sep. 11, 2019

(86) PCT No.: PCT/KR2019/011893
§ 371 (c)(1),
(2) Date: Mar. 15, 2021

(87) PCT Pub. No.: WO2020/055203
PCT Pub. Date: Mar. 19, 2020

(65) Prior Publication Data
US 2022/0075426 A1 Mar. 10, 2022

(30) Foreign Application Priority Data

Sep. 13, 2018 (KR) .................. 10-2018-0109827
Feb. 28, 2019 (KR) .................. 10-2019-0024425
(Continued)

(51) Int. Cl.
G06F 1/16 (2006.01)
(52) U.S. Cl.
CPC .......... G06F 1/1666 (2013.01); G06F 1/1647 (2013.01); G06F 1/1654 (2013.01);
(Continued)

(58) Field of Classification Search
CPC .... G06F 1/1616; G06F 1/1632; G06F 1/1647; G06F 1/1654; G06F 1/1658;
(Continued)

(56) References Cited

U.S. PATENT DOCUMENTS 6,266,234 B1 * 7/2001 Leman .................... G06F 1/169
361/679.08
6,674,636 B2 * 1/2004 Loo ........................ H01H 13/86
345/903

(Continued)

FOREIGN PATENT DOCUMENTS

JP 2004-118803 A 4/2004
JP 2012-138067 A 7/2012
(Continued)

Primary Examiner — Nidhi Thaker
(74) Attorney, Agent, or Firm — Maschoff Brennan

(57) ABSTRACT

A foldable multimedia terminal capable of providing a keyboard input condition or a dual screen is disclosed, comprising: a foldable keyboard having one-side keyboard and the other-side keyboard foldably connected to the one-side keyboard such that a user performs an input; a first terminal unit which has a touch display so as to allow an input to be carried out by means of the foldable keyboard or by means of touch, while being linked with the foldable keyboard; a second terminal unit which is provided so as to be integrated with or separated from the rear surface of the one-side keyboard and/or the other-side keyboard constituting the foldable keyboard, and which provides the dual screen together with the first terminal unit or takes over the function of the first terminal unit while being linked with the first terminal unit; and a terminal holder.

20 Claims, 14 Drawing Sheets

(30) Foreign Application Priority Data

Mar. 2, 2019 (KR) .................. 10-2019-0024451
Jul. 3, 2019 (KR) .................. 10-2019-0080418

(52) U.S. Cl.
CPC .......... *G06F 1/1677* (2013.01); *G06F 1/1616* (2013.01); *G06F 1/1632* (2013.01)

(58) Field of Classification Search
CPC .... G06F 1/1662; G06F 1/1666; G06F 1/1628; G06F 1/1677
See application file for complete search history.

(56) References Cited

U.S. PATENT DOCUMENTS

| | | | | |
|---|---|---|---|---|
| 6,700,773 | B1* | 3/2004 | Adriaansen | G06F 1/1643 361/679.08 |
| 6,798,649 | B1* | 9/2004 | Olodort | G06F 1/1618 345/905 |
| 6,803,904 | B2* | 10/2004 | Furuki | H04M 1/72409 361/679.3 |
| 7,848,786 | B2* | 12/2010 | Liu | H04M 1/0247 455/575.4 |
| 8,238,084 | B2* | 8/2012 | Chen | G06F 1/1671 361/679.14 |
| 10,705,574 | B2* | 7/2020 | Robinson | H04M 1/04 |
| 11,422,589 | B1* | 8/2022 | Chen | G06F 1/1671 |
| 2003/0206394 | A1* | 11/2003 | Ossia | G06F 3/0238 361/679.09 |
| 2004/0052044 | A1* | 3/2004 | Mochizuki | G06F 1/1616 361/679.09 |
| 2005/0146446 | A1* | 7/2005 | Hsu | G06F 3/0221 341/22 |
| 2007/0049376 | A1* | 3/2007 | Cho | G06F 1/1616 463/46 |
| 2007/0247793 | A1* | 10/2007 | Carnevali | G06F 1/1656 361/679.1 |
| 2008/0273012 | A1* | 11/2008 | Bullister | G06F 1/1656 345/169 |
| 2010/0141588 | A1* | 6/2010 | Kimura | G11B 33/10 345/169 |
| 2012/0162080 | A1* | 6/2012 | Cao | G06F 1/1669 345/168 |
| 2015/0121516 | A1* | 4/2015 | Korkishko | G06F 21/31 726/19 |
| 2016/0274675 | A1* | 9/2016 | Carreon | G06F 1/1654 |
| 2019/0258300 | A1* | 8/2019 | Gerardi | G06F 1/1654 |

FOREIGN PATENT DOCUMENTS

| | | | | |
|---|---|---|---|---|
| KR | 10-2004-0107863 | | 12/2004 | |
| KR | 10-0867608 | B1 | 11/2008 | |
| KR | 10-2014-000043 | A | 1/2014 | |
| KR | 20140000043 | A * | 1/2014 | |
| KR | 10-2016-0136174 | A | 11/2016 | |
| WO | WO-2005026926 | A2 * | 3/2005 | .......... G06F 1/1616 |
| WO | 2018/069883 | A1 | 4/2018 | |

* cited by examiner

FOLDABLE MULTIMEDIA TERMINAL

TECHNICAL FIELD

Embodiments disclosed herein relate to a foldable multimedia terminal, and more specifically, to a foldable multimedia terminal capable of mounting a terminal carried and used by a user while providing a keyboard input environment or a dual screen.

BACKGROUND ART

In general, a portable multimedia terminal refers to an electronic device capable of performing wireless communication with a counterpart while being carried by a user. In consideration of portability, the multimedia terminal tends to have a small size and a slim structure while being easily gripped with lightweight, and moves toward multimedia that can realize more various functions.

In particular, the multimedia terminal in the future may be used with miniaturization, lightweight, multi-function, and multi-purpose, and may be transformed to adapt to various multimedia environments or Internet environments.

In addition, the portable multimedia terminal is an electronic device that is extensively used anywhere in the world regardless of age or sex and is increasingly recognized as necessities to be carried at all times.

Conventional multimedia terminals are classified into various types depending on external appearance thereof. For example, portable terminals are classified into bar-type, flip-type, or folder-type communication devices according to their external appearance. A bar-type communication device refers to a device where a single housing is configured as a bar-type, a flip-type communication device refers to a device where a flip is rotatably coupled to a bar-type housing by a hinge device, and a folder-type communication device refers to a device where a folder is foldably and rotatably connected to a single bar-type housing by a hinge device.

Such multimedia terminals may provide multimedia contents such as Internet surfing, movie watching and music listening, as well as voice and video calls, and recently perform functions such as e-commerce and mobile banking.

As a related art, a terminal disclosed in Korean Unexamined Patent Publication No. 10-2004-0107863 proposes a configuration capable of expanding a display, but there is a problem of weak security since all contents are provided from one terminal. Accordingly, a new technique is required to overcome the limitations of the related art as described above.

In addition, as the contents are developed recently, the contents can be provided on a dual screen or provided by using a separate keypad, so a new technique capable of interworking a plurality of multiple terminals as needed is required.

Meanwhile, the above-described background art is technical information that the inventor possesses to suggest the present invention or acquires during the suggestion of the present invention, and it is not necessarily regarded as a known technique that has been disclosed to the general public prior to the filing of the present invention.

DETAILED DESCRIPTION OF THE INVENTION

Technical Problem

An object of embodiments disclosed herein is to provide a foldable multimedia terminal capable of mounding and using one terminal as needed while providing a keyboard input environment or a plurality of screens through at least one other terminal unit.

In addition, an object of embodiments disclosed herein is to provide a foldable multimedia terminal capable of easily mounting or separating a terminal.

Further, an object of embodiments disclosed herein is to provide a foldable multimedia terminal capable of protecting a terminal mounted thereon by shielding the terminal such that the terminal can be touched.

In addition, an object of embodiments disclosed herein is to provide a foldable multimedia terminal capable of automatically operating another terminal provided on a rear surface of a foldable keyboard when the foldable keyboard is folded.

Further, it is an object to provide a foldable multimedia terminal capable of improving the security by independently separating open type contents and security type contents such that the open type contents can be distinctly executed by an open function unit and the security type contents can be distinctly provided (executed) by a security function unit.

Technical Solution

As a technical solution for achieving the above-described technical objects, a foldable multimedia terminal according to an embodiment includes: a foldable keyboard having one-side keyboard and another-side keyboard foldably connected to the one-side keyboard such that a user performs an input; a first terminal unit including a touch display so as to allow an input to be carried out by means of the foldable keyboard or by means of touch, while interworking with the foldable keyboard, and which performs at least one from among calling, Internet communication, and multimedia content functions; a second terminal unit which is provided so as to be integrated with or separated from a rear surface of the one-side keyboard and the other-side keyboard constituting the foldable keyboard, and which provides a dual screen together with the first terminal unit or takes over a function of the first terminal unit while interworking with the first terminal unit; and a terminal holder which is provided on the foldable keyboard so as to accommodate the first terminal unit or which accommodates one of the first terminal unit and the second terminal unit when the second terminal unit is separably provided on the foldable keyboard.

As a technical solution for achieving the above-described technical objects, a foldable multimedia terminal according to an embodiment includes: a foldable keyboard having one-side keyboard and an other-side keyboard foldably connected to the one-side keyboard such that a user performs an input; a first terminal unit including a touch display so as to allow an input to be carried out by means of the foldable keyboard or by means of touch, while interworking with the foldable keyboard, and which performs at least one from among calling, Internet communication, and multimedia content functions; a second terminal unit which is provided so as to be integrated with or separated from a rear surface of the one-side keyboard and the other-side keyboard constituting the foldable keyboard, and which provides a dual screen together with the first terminal unit or takes over a function of the first terminal unit while interworking with the first terminal unit; and a terminal holder foldably provided on the foldable keyboard and integrally formed with the first terminal unit such that the terminal holder is unfolded or folded on the foldable keyboard together with the first terminal unit.

Advantageous Effects of the Invention

According to any one of the above-described technical solutions, since the first terminal unit can be separably accommodated in the terminal holder, input/output can be performed through the foldable keyboard while using the first terminal unit mounted on the terminal holder, and since the second terminal unit is provided on the rear surface of the foldable keyboard, the first terminal unit and the second terminal unit can be used as a dual screen by folding the foldable keyboard.

In addition, according to any one of the above-described technical solutions, since the second terminal unit interworks with the first terminal unit and provides the input/output environment of the first terminal unit instead of the first terminal unit, when the first terminal unit is folded in the form of the foldable keyboard, the function of the first terminal unit may be performed by the second terminal unit.

Further, according to any one of the above-described technical solutions, the terminal holder includes the mounting panel having the mounting groove, so that the terminal unit is seated in the mounting groove, and thus, one of the first terminal unit and the second terminal unit separated from the foldable keyboard can be easily mounted and used.

In addition, according to any one of the above-described technical solutions, since the touch cover is coupled to the mounting panel while shielding the terminal unit such that the terminal unit can be touched, the terminal unit seated on the mounting panel can be protected from the external environment.

Further, according to any one of the above-described technical solutions, in case the mounting slot is formed on the mounting panel, the terminal unit can be mounted on the mounting panel in a sliding manner, so that the terminal unit can be easily mounted and prevented from being unintentionally separated.

In addition, according to any one of the above-described technical solutions, in case the connection bar is provided on the mounting panel, the foldable multimedia terminal capable of changing the direction of the terminal unit coupled to the mounting panel can be presented.

Further, according to any one of the above-described technical solutions, in case the foldable keyboard is folded, the second terminal unit is automatically operated by the keyboard folding detection sensor to provide a dual screen together with the first terminal unit, and in case the first terminal is folded on the foldable keyboard, the first terminal unit is automatically turned off by the terminal unit folding detection sensor and the second terminal is automatically operated, so that the terminal units can be automatically operated according to the folding type.

In addition, according to any one of the above-described technical solutions, since the foldable keyboard is configured to be opened and closed by the holder touch cover, the second terminal unit or the third terminal unit can be used by separating it from the foldable keyboard.

Further, the security can be improved by independently separating open type contents and security type contents such that the open type contents can be distinctly executed by an open function unit and the security type contents can be distinctly provided (executed) by a security function unit.

The effects obtained in the disclosed embodiments are not limited to the above-mentioned effects, and other effects that are not mentioned can be clearly comprehended by those skilled in the art in the technical field to which the embodiments pertain.

BEST MODE

Hereinafter, preferred embodiments will be described in detail with reference to the accompanying drawings.

Figure 1:
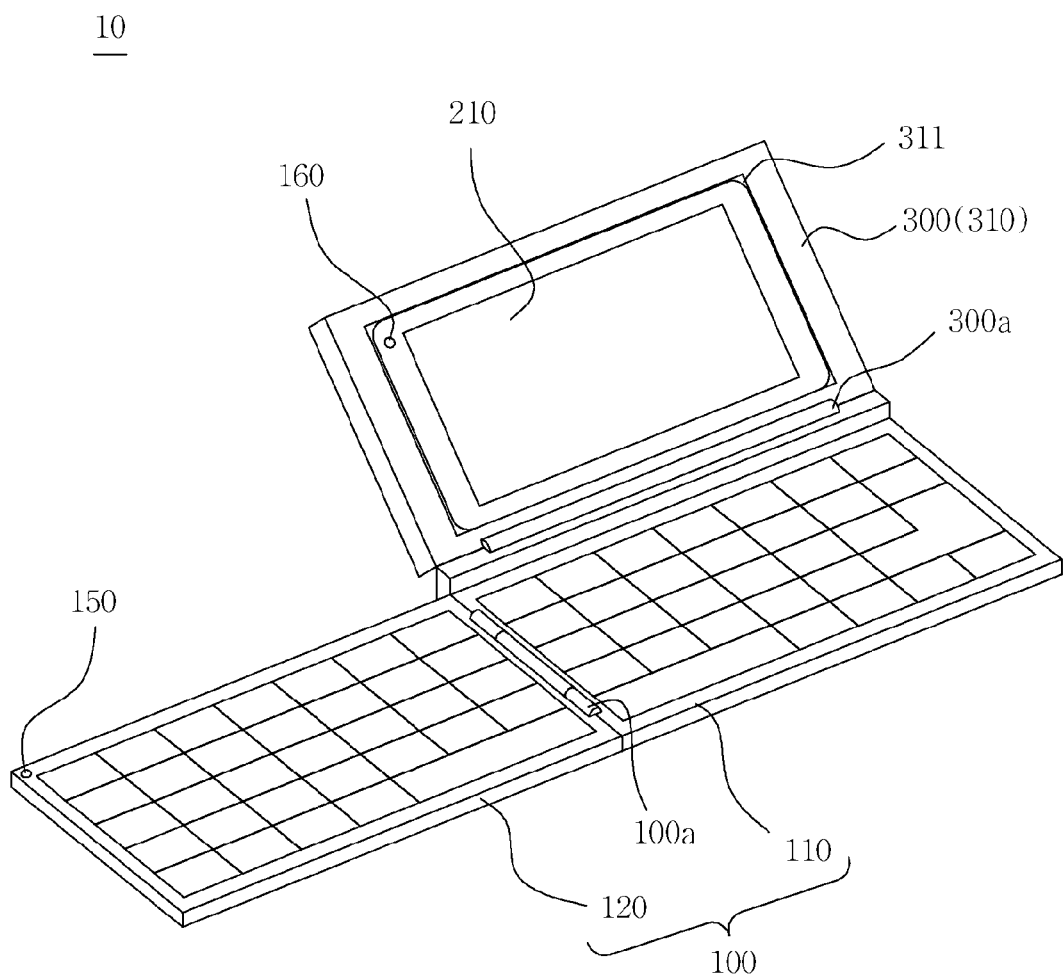
FIG. 1 is a perspective view showing an unfolded state of a foldable multimedia terminal according to an embodiment.
Figure 2:
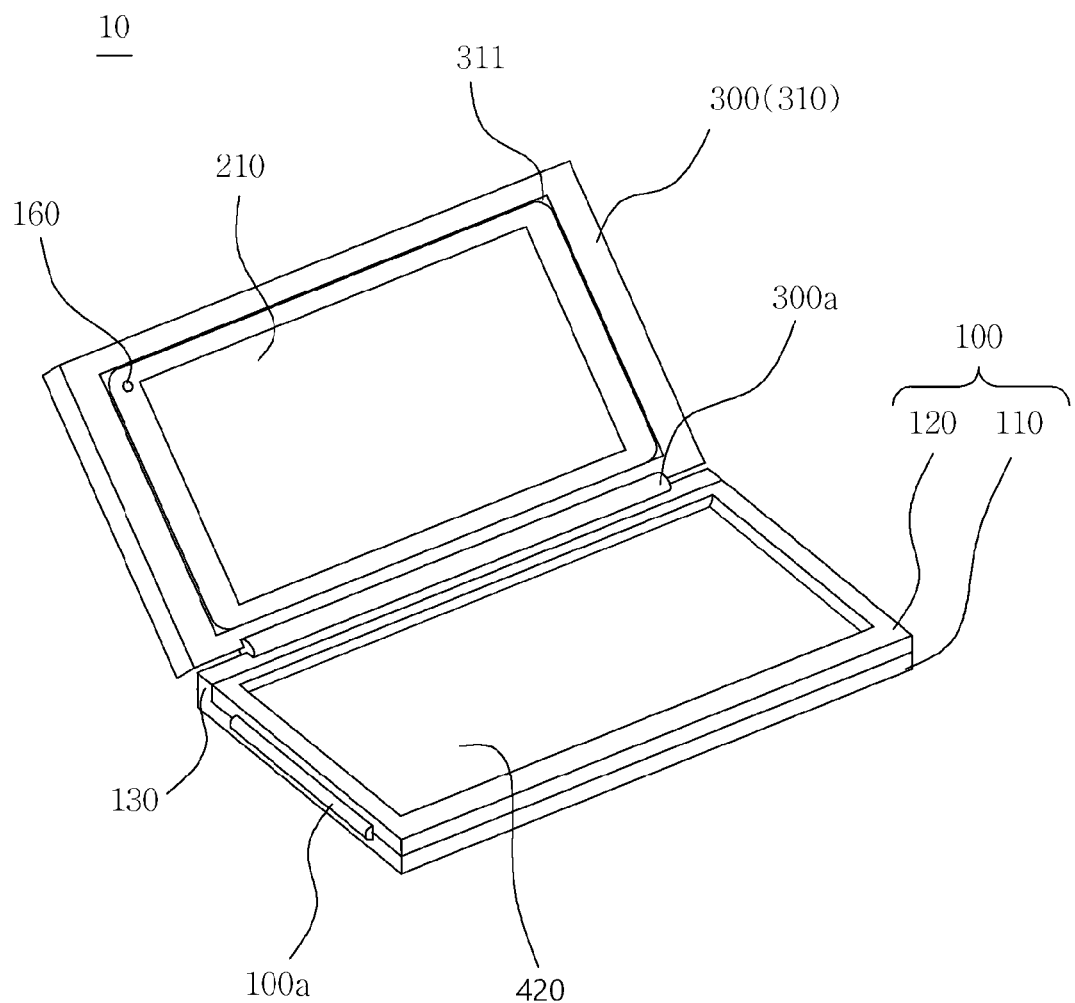
FIG. 2 is a perspective view showing a folded state of a foldable keyboard of a foldable multimedia terminal according to an embodiment.
Figure 6:
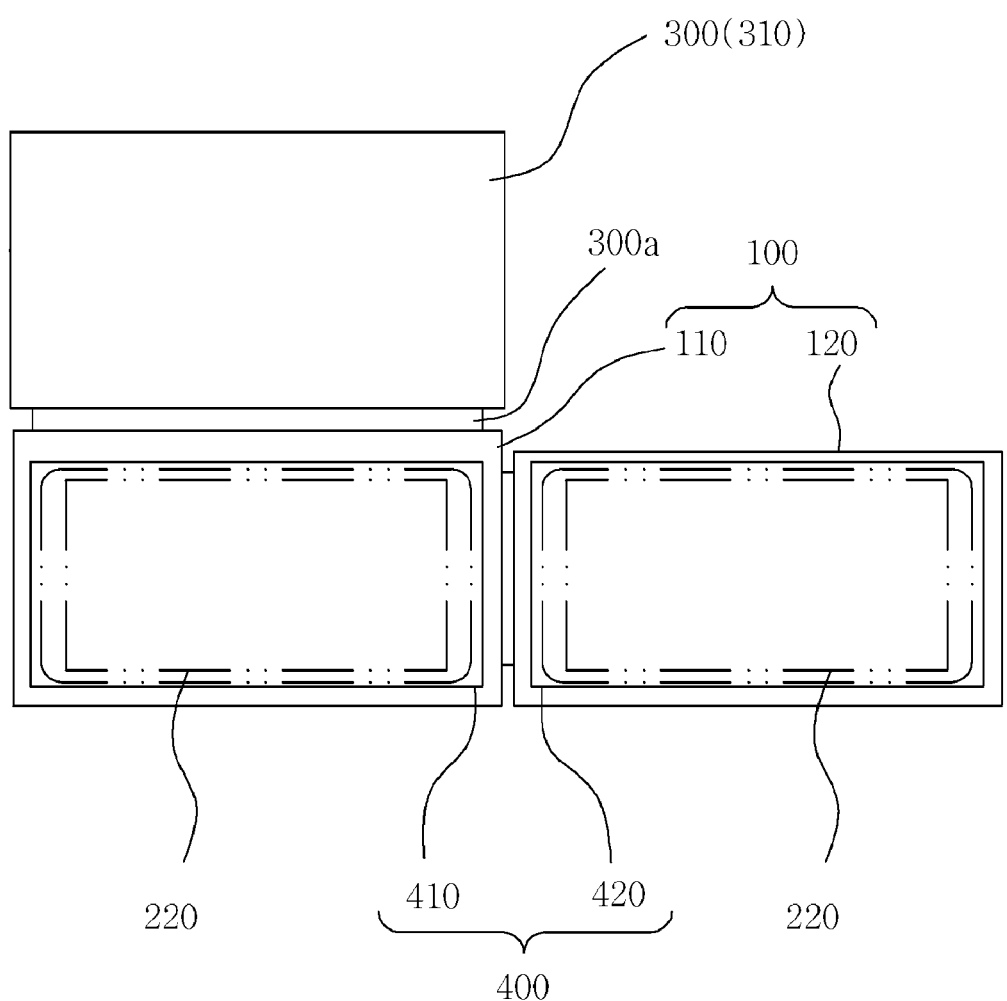
FIG. 6 is a rear view showing a keyboard holder provided on the rear surface of the foldable keyboard.
Figure 7:
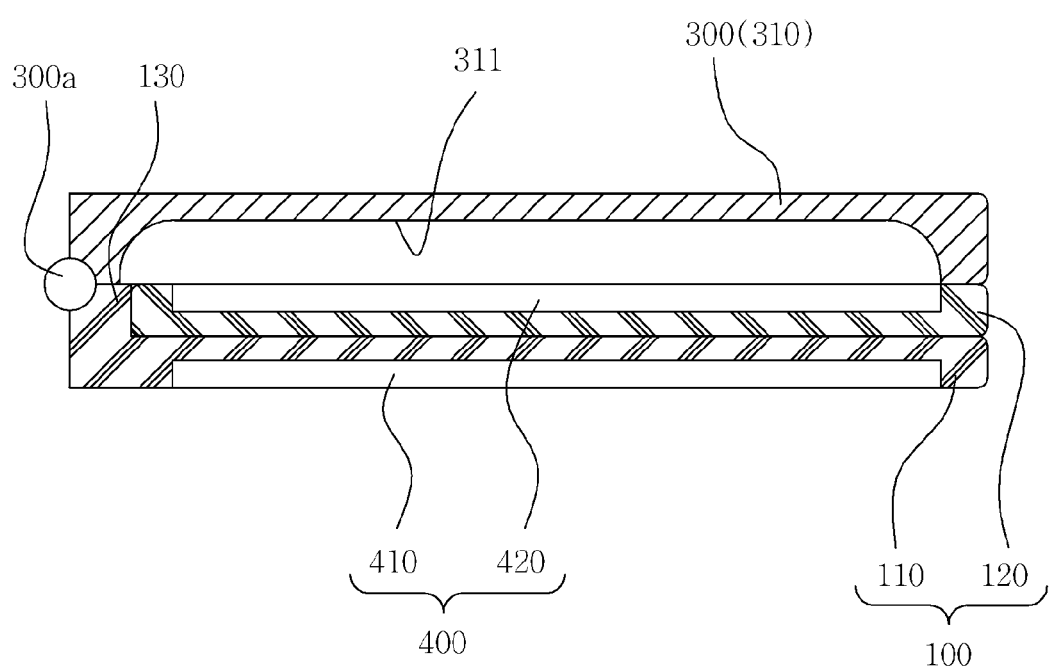
FIG. 7 is a longitudinal sectional view showing a folded state of the foldable multimedia terminal according to an embodiment.
Figure 8:
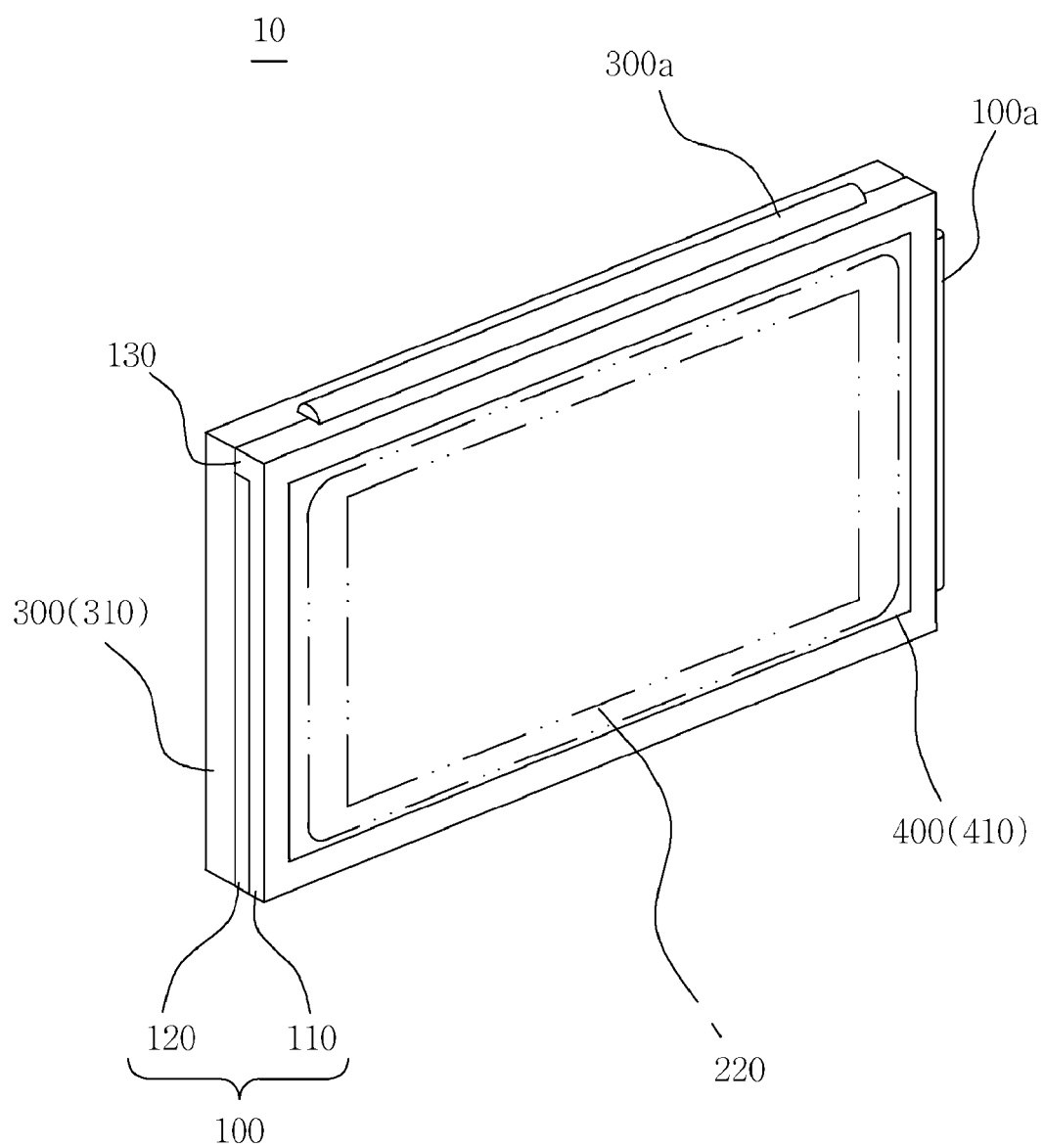
FIG. 8 is a perspective view showing a folded state of a foldable multimedia terminal according to an embodiment.
Figure 10:
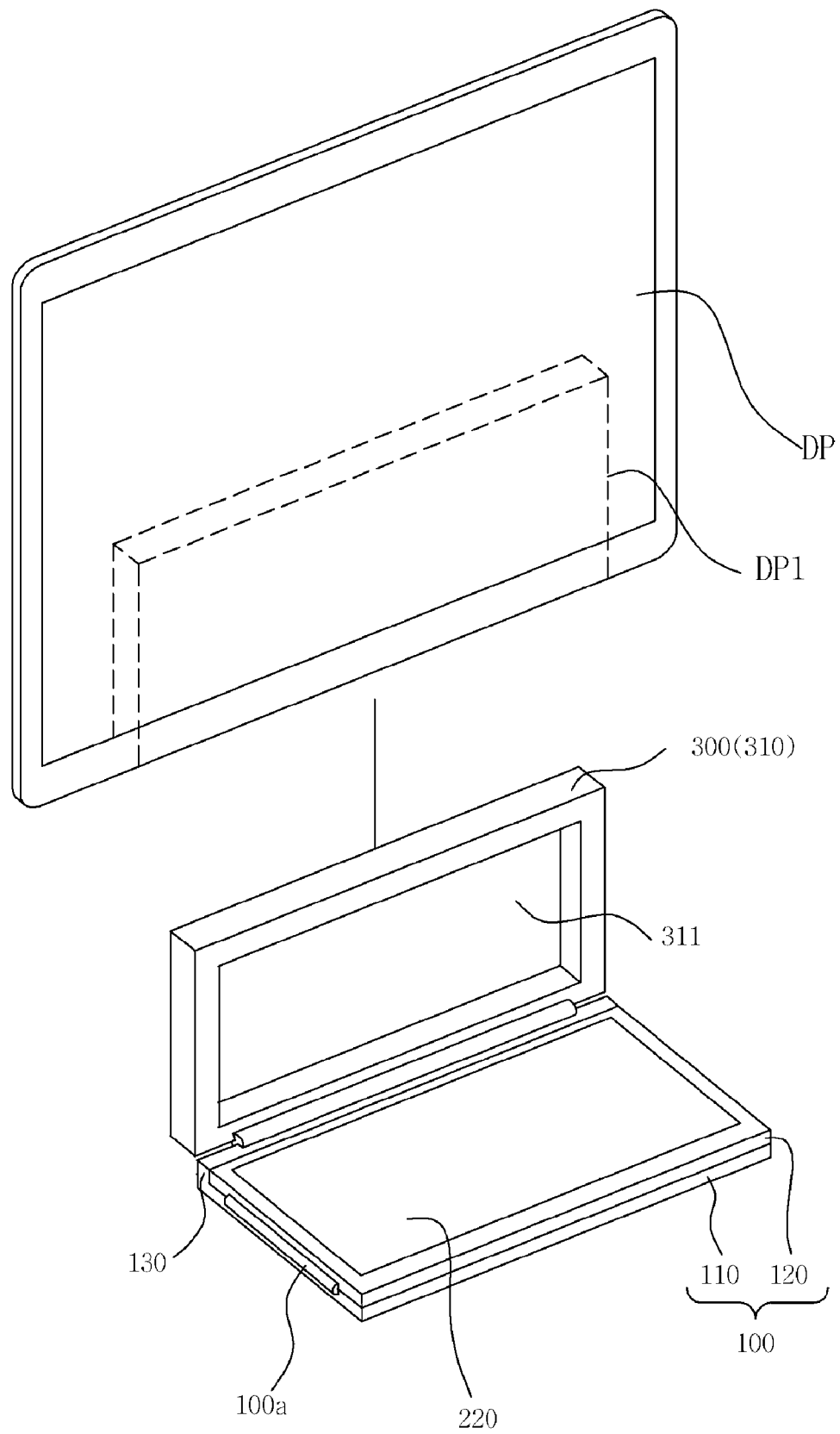
FIG. 10 is a perspective view showing a state of use of a foldable multimedia terminal.
Figure 14:
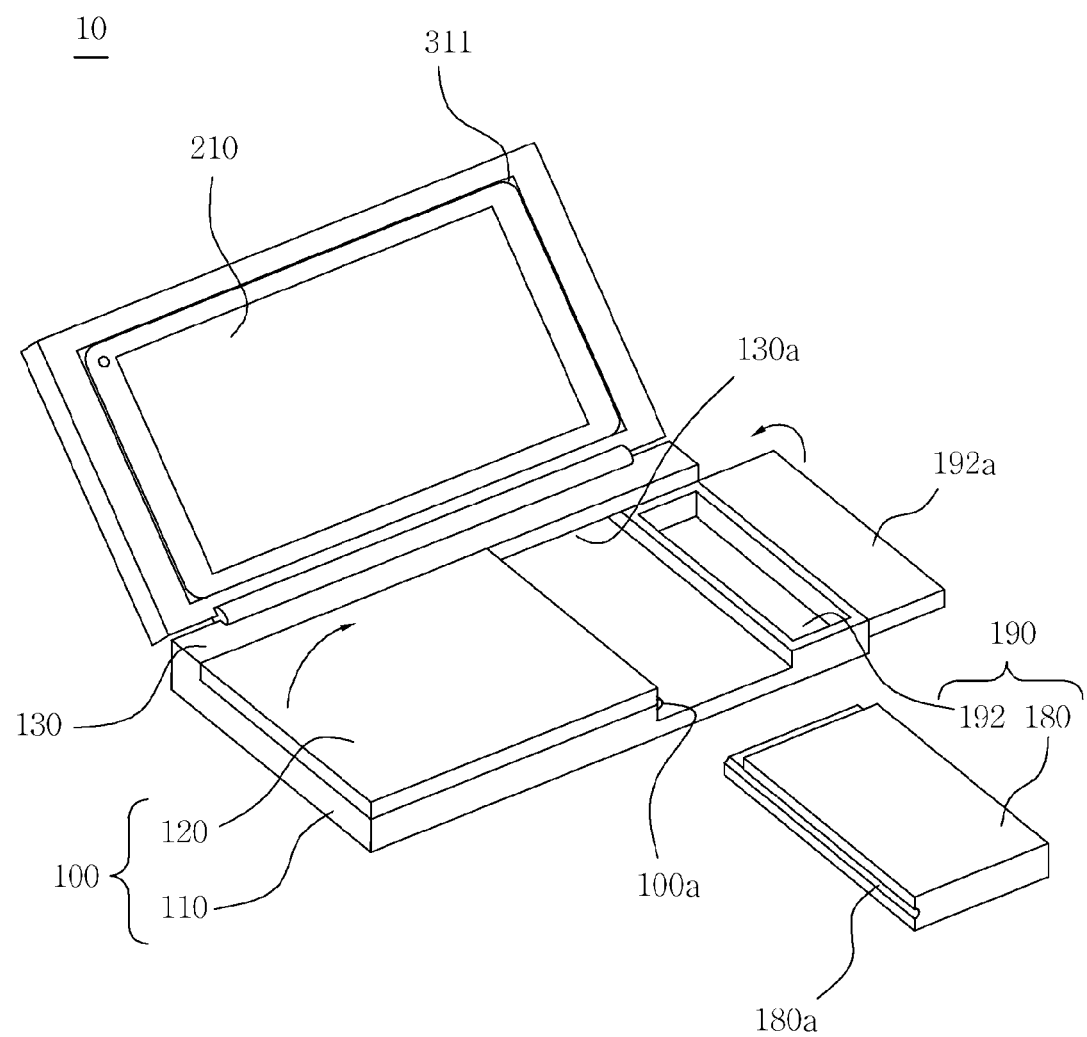
FIG. 14 is a perspective view showing still another embodiment of a foldable keyboard.

FIG. 1 is a perspective view showing an unfolded state of a foldable multimedia terminal according to an embodiment, FIG. 2 is a perspective view showing a folded state of a foldable keyboard of a foldable multimedia terminal according to an embodiment, FIG. 6 is a rear view showing a keyboard holder provided on the rear surface of the foldable keyboard, FIG. 7 is a longitudinal sectional view showing a folded state of the foldable multimedia terminal according to an embodiment, FIG. 8 is a perspective view showing a folded state of a foldable multimedia terminal according to an embodiment, FIG. 10 is a perspective view showing a state of use of a foldable multimedia terminal, and FIG. 14 is a perspective view showing still another embodiment of a foldable keyboard.

The foldable multimedia terminal 10 according to a preferred embodiment can provide a keyboard input environment or a dual screen through a plurality of terminals, and may include a foldable keyboard 100, a first terminal unit 210, a second terminal unit 220, and a terminal holder 300 as shown in FIGS. 1 and 2.

The foldable keyboard 100 is a component that provides an input environment for a user to the first terminal unit 210 to be described below.

Specifically, as shown in FIG. 1, the foldable keyboard 100 may be divided into one-side keyboard 110 and the other-side keyboard 120 and may be foldably connected by a keyboard hinge 100a.

In addition, the one-side keyboard 110 of the foldable keyboard 100 may be foldably connected to a terminal holder 300 to be described below through a holder hinge 300a.

In this case, the keyboard hinge 100a may have any configuration so long as it is configured in a hinge structure or a flexible band structure that allows the one-side keyboard 110 and the other-side keyboard 120 to be folded, and the folding structure is a component provided therein with a flexible printed circuit board (FPCB) or a cable, which is not shown, capable of transmitting either or both of power and signals. Accordingly, as shown in FIG. 2, the one-side keyboard 110 and the other-side keyboard 120 of the foldable keyboard 100 may be folded, and, as shown in FIGS. 7 and 8, the first terminal unit 210 to be described below may be folded together through the terminal holder 300 to be described below.

The one-side keyboard 110 and the other-side keyboard 120 of the foldable keyboard 100 may be configured in the same manner as a conventional keyboard.

In addition, the foldable keyboard 100 may be equipped with a battery, which is not shown, or connected to an external power source so as to be operated by power, and may supply power to the second terminal unit 220 to be described below.

Further, the foldable keyboard 100 may be provided with a control module that is not shown and controls the operation of the first terminal unit 210 and the second terminal unit 220, which will be described below, while controlling interworking or communication between devices.

The foldable keyboard 100 may be operated through a control module, which is not shown, and may be used as a keyboard while being connected to another computer, tablet PC, or smart phone.

Meanwhile, the foldable keyboard 100 may be provided with a step 130 as shown in FIGS. 1 and 2.

In detail, the step 130 is for providing a mounting portion for the other-side keyboard 120 on the one-side keyboard 110, and has an 'L'-shaped section on the one-side keyboard 110 to accommodate the other-side keyboard 120 when the other-side keyboard 120 is folded.

That is, as shown in FIG. 2, the other-side keyboard 120 may be rested on the step 130 of the one-side keyboard 110 when it is folded so that the one-side keyboard 110 can be folded while being prevented from being shaken.

In addition, as shown in FIG. 7, since the one-side keyboard 110 and the other-side keyboard 120 may precisely overlap each other through the step 130, the foldable keyboard 100 may have a thickness the same as that of the terminal holder 300 to be described below, so that it is possible to allow the terminal holder 300, which will be described below, to be smoothly folded in a state in which the one-side keyboard 110 and the other-side keyboard 120 are folded.

The first terminal unit 210 is a component including a touch display that interworks with the foldable keyboard 100 to make an input by the foldable keyboard 100 or a touch.

The input to the first terminal unit 210 may be realized by the foldable keyboard 100 while the first terminal unit 210 is operated by the above-described control module, and alternatively, the input by the touch of a user may be realized.

In addition, the first terminal unit 210 may provide at least one function of multimedia contents including camera operation, phone calls, Internet communication, and games while being operated by the control module.

Further, the first terminal unit 210 may be configured as a normal smartphone or tablet computer and independently portable by the user, and may be configured as a flat display, a foldable display, a rollable display, a covered display, and a deformable display or a stretchable display.

The first terminal unit 210 may provide contents through a communication module (open type or security type), which may be separately (dividedly) provided in either or both of the first terminal unit 210 and the terminal holder 300, otherwise, may provide the contents through the communication module provided in the above-described control module.

In addition, as shown in FIG. 1, the first terminal unit 210 may be separably mounted on the foldable keyboard 100 while being accommodated through the terminal holder 300 to be described below.

In addition, the first terminal unit 210 may interwork with the flexible keyboard 100 through the control module of the foldable keyboard 100 described above to provide an input environment for the foldable keyboard 100 and may be connected to the second terminal unit 220 to be described below in order to interwork with the second terminal unit 220.

The second terminal unit 220 may provide a dual screen together with the first terminal unit 210 while interworking with the first terminal unit 210 or perform a function of the first terminal unit 210 instead of the first terminal unit 210.

As shown in FIG. 6, the second terminal unit 220 may be separably accommodated in a keyboard holder 400 provided on a rear surface of the foldable keyboard 100.

The second terminal unit 220 may provide the same contents as the first terminal unit 210 while interworking with the first terminal unit 210, and, as shown in FIG. 2, when the foldable keyboard 100 is folded, the second terminal unit 220 may be arranged in parallel with the first terminal unit 210a to provide a dual image together r with the first terminal unit 210.

In addition, the second terminal unit 220 may provide an input environment to the first terminal unit 210 by providing a software keyboard while being connected to the first terminal unit 210.

Further, the second terminal unit 220 may be provided therein with a communication module to perform independent calls or Internet communication. In addition, if the configuration of the communication module is omitted, the second terminal unit 220 is operated under the control of the control module to provide at least one of multimedia contents including camera operation, calls, Internet communication, and games.

As shown in FIG. 6, when the second terminal unit 220 is configured to be separated from the keyboard holder 400, which will be described below, the second terminal unit 220 may be selectively accommodated in any one of the first holder 410 and the second holder 420, or may be accommodated in the terminal holder 300 to be described below.

Specifically, the keyboard holder 400 is a component provided on a rear surface of at least one of the one-side keyboard 110 and the other-side keyboard 120 for separably accommodating the second terminal unit 220, and may include a first holder 410 and a second holder 420.

The first holder 410 may be provided in the form of a groove, a pocket, or a slot on the rear surface of one of the one-side keyboard 110 and the other-side keyboard 120 to accommodate the second terminal unit 220, and the second holder 410 may be provided in the form of a groove, a pocket, or a slot on the rear surface of the remaining one of the one-side keyboard 110 and the other-side keyboard 120 to accommodate the second terminal unit 220.

That is, the second terminal unit 220 may be selectively accommodated in one of the first holder 410 and the second holder 420.

When the second terminal unit 220 is accommodated in the second holder 420, the second terminal unit 220 may be arranged in parallel with the first terminal unit 210 as the foldable keyboard 100 is folded, thereby providing a dual screen together with the first terminal unit 210.

In addition, when the second terminal unit 220 is accommodated in the first holder 420, as shown in FIG. 8, the second terminal unit 220 is disposed on the rear surface of one-side keyboard 110 in a state in which the first terminal unit 210 is folded, thereby performing the function of the first terminal unit 210 instead of the first terminal unit 210.

Meanwhile, the keyboard holder 400 may accommodate the second terminal unit 220 in one of the first holder 410 and the second holder 420, and peripherals devices such as a memory, a cable or a mouse may be accommodated in the remaining one of the first holder 410 and the second holder 420.

In addition, the first holder 410 and the second holder 420 may be shielded and opened or closed by a holder touch cover, which is not shown, so as to enable a touch to the second terminal unit 220.

As shown in FIGS. 1 and 2, the terminal holder 300 is a component that provides an accommodation space where one of the first terminal unit 210 and the second terminal unit 220 can be separably accommodated.

For example, the terminal holder 300 separably accommodates the first terminal unit 210 in a state in which the terminal holder 300 is foldably connected to the one-side keyboard 110 constituting the foldable keyboard 100 through a holder hinge 300*a*, so that the first terminal unit 210 can be folded with respect to the foldable keyboard 100.

Accordingly, as shown in FIGS. 7 and 8, the first terminal unit 210 can be shielded from the outside by being folded to the foldable keyboard 100 together with the terminal holder 300 so that the first terminal unit 210 can be protected from the external environment.

For example, as shown in FIGS. 1 and 2, the terminal holder 300 may be configured to include a mounting panel 310.

The mounting panel 310 provides a mounting surface for the first terminal unit 210 and is formed in a plate shape as shown in the drawing and foldably connected to the one-side keyboard constituting the foldable keyboard 100 through the holder hinge 300*a*, so that a mounting groove 311 for mounting the first terminal unit 210 can be formed and the first terminal unit 210 can be mounted in the mounting groove It is also possible to mount the second terminal unit 220 on the mounting panel 310 constituting the terminal holder 300, instead of the first terminal unit 210.

Meanwhile, the terminal holder 300 may provide a connection portion to be connected to a separate external display DP as shown in FIG. 10.

That is, the terminal holder 300 may be separably inserted and connected to a connection unit DP1 formed on the external display DP to allow the external display DP, the foldable keyboard 100, and the first terminal unit 210 to interwork with each other.

The external display DP is a component configured separately from the open function unit OF or the security function unit SF, and may include a foldable display that is bent beyond a predetermined radius of curvature or foldable about the folding axis, a rollable display that is rolled with a predetermined radius of curvature, a deformable display that is freely deformable, or a stretchable display and may be separately carried by the user. In addition, the external display may be configured as a curved display that is fixed with a predetermined curvature, a flat display, or a display used as a monitor of a PC.

In addition, since the external display DP is configured to have a larger size than the first terminal unit 210, the screen of the first terminal unit 210 or the security function unit SF may be provided with an enlarged size.

The external display DP may be connected to at least one of the open function unit OF, the foldable keyboard 100, and the security function unit SF through an external display connection unit (not shown) to be described below in order to provide the contents of the open function unit OF or the security function unit SF, while enabling an input by a touch or a user or an input through the foldable keyboard 100.

The external display connection unit (not shown) is a component that provides a connection portion of the external display DP to at least one of the above-described open function unit OF, foldable keyboard 100, and security function unit SF in order to connect the external display DP to the open function unit OF, the foldable keyboard 100, or the security function unit SF.

A connection portion of the external display DP may be provided on at least one of the terminal holder 300 and the foldable keyboard 100, and an external display connection portion(not shown) may be provided, in which the external display connection portion is separably inserted into the connection unit DP1 formed on the external display DP to connect the external display DP to the terminal holder 300 or the foldable keyboard 100.

The external display connection portion (not shown) may be configured as a connection unit including a cable such as a USB port for wire connection, and alternatively, the external display 600 may be wirelessly connected to other components.

Meanwhile, the holder hinge 300*a* is a component for adjusting an inclination angle of the terminal holder 300 while foldably connecting the mounting panel 310 constituting the terminal holder 300 to the one-side keyboard 110 constituting the foldable keyboard 100.

The holder hinge 300*a*, for example, may have the same configuration as a tilting hinge device applied to a notebook computer, so that the holder hinge 300*a* may adjust the inclination angle of the terminal holder 300 while allowing the terminal holder 300 to be folded or unfolded.

In addition, the holder hinge 300*a* may have any configuration so long as it can adjust the inclination angle of the mounting panel 310 while folding the mounting panel 310 and the one-side keyboard 110.

Meanwhile, unlike the drawings, the terminal holder 300 may be provided on a lateral side of the foldable keyboard 100, or may be provided in the form of a groove or a pocket on the rear surface of the foldable keyboard 100.

That is, the above-described keyboard holder 400 may be an embodiment of the terminal holder 300.

Meanwhile, as shown in FIG. 1, the foldable multimedia terminal 10 according to the preferred embodiment may further include a keyboard folding detection sensor 150.

The keyboard folding detection sensor 150 is a component for automatically operating the second terminal unit 220 when the foldable keyboard 100 is folded.

In addition, as shown in FIG. 2, the foldable multimedia terminal 10 according to an embodiment may further include a terminal unit folding detection sensor 160.

The terminal unit folding detection sensor 160 is a component for automatically operating the second terminal unit 220 when the first terminal unit 210 is folded on the foldable keyboard 100.

Such a terminal unit folding detection sensor 160 may be provided in the above-described holder hinge 300a.

Meanwhile, as shown in FIG. 14, the foldable keyboard 100 may have a keyboard formed only on a part of the one-side keyboard 110, and a storage unit 190 for providing a storage space may be provided in the rest of the one-side keyboard 110.

In this case, the other-side keyboard 120 may be configured to have a length corresponding to the keyboard of the one-side keyboard 110, and may be unfolded toward the storage unit 190 while rotating about the keyboard hinge 100a.

The storage unit 190 is configured to accommodate the second terminal unit 220 or peripheral devices, and may include a storage case 180 and a storage box 192 as shown in FIG. 14.

A method of operating the foldable multimedia terminal 10 according to a preferred embodiment including the above components will be described.

After mounting the first terminal unit 210 on the mounting panel 310, the user can perform the input through the foldable keyboard 100 while maintaining the mounting panel 310 at a predetermined angle in order to use the contents of the terminal unit 210.

When implementing the dual screen, the user folds the other-side keyboard 120 to the one-side keyboard 110.

At this point, the second terminal unit 220 may be accommodated in the second holder 420 provided on the other-side keyboard 120, and the keyboard folding detection sensor 150 may automatically operate the second terminal unit 500 by detecting the other-side keyboard 120 that is folded to the one-side keyboard 110.

Accordingly, the user can use the contents through the dual screen provided by the first terminal unit 210 and the second terminal unit 220.

When the use of the first terminal unit 210 is terminated, the user folds the first terminal unit 210 onto the foldable keyboard 100.

At this point, the second terminal unit 220 may be accommodated in the first holder 410 provided on the one-side keyboard 110, and the terminal unit folding detection sensor 160 may automatically operate the screen of the second terminal unit 220 while turning off the screen of the first terminal unit 210 by detecting the first terminal unit 210 being folded.

As described above, the user can use the foldable multimedia terminal 10 according to the preferred embodiment by easily mounting the first terminal unit 210 on the terminal holder 300, and the input environment can be provided through the foldable keyboard 100 or various contents can be provided through the second terminal unit 220.

MODE FOR INVENTION

Hereinafter, various embodiments will be described in detail with reference to the accompanying drawings. The embodiments described below may be modified and implemented in various different forms. In order to more clearly describe the features of the embodiments, detailed descriptions of configurations widely known to those skilled in the art to which the following embodiments pertain will be omitted. In addition, parts not related to the description of the embodiments are omitted in the drawings, and similar reference numerals are assigned to similar parts throughout the specification.

Throughout the specification, when a configuration is referred to be "connected" with another configuration, this may include not only the case where it is 'directly connected', but also the case where it is 'connected with another configuration interposed there between'. In addition, when a certain configuration "includes" another configuration, this means that other configurations may be further included rather than excluded unless otherwise specified.

Hereinafter, embodiments will be described in detail with reference to the accompanying drawings.

Figure 3:
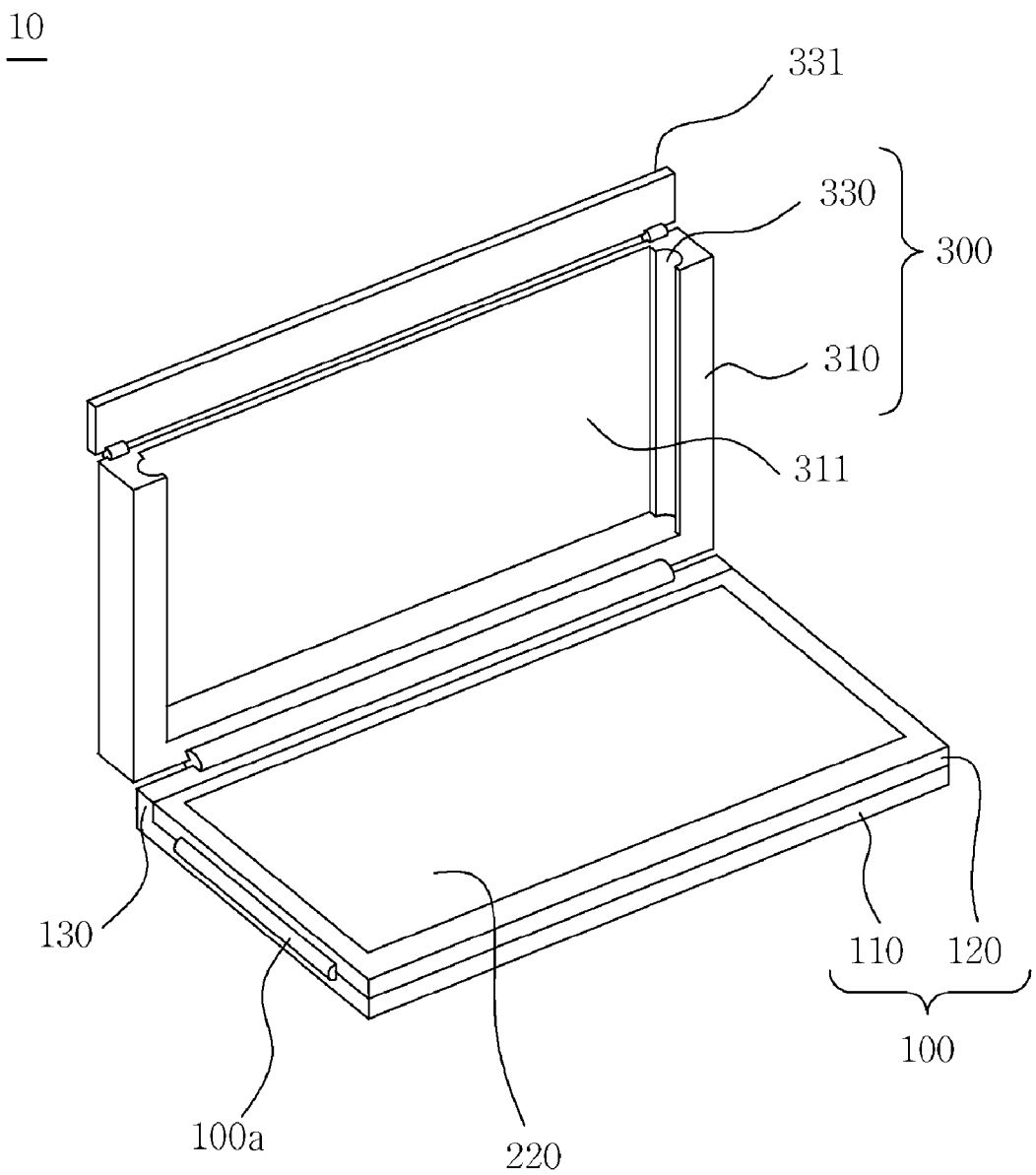
FIG. 3 is a perspective view showing another embodiment of a terminal holder.
Figure 4:
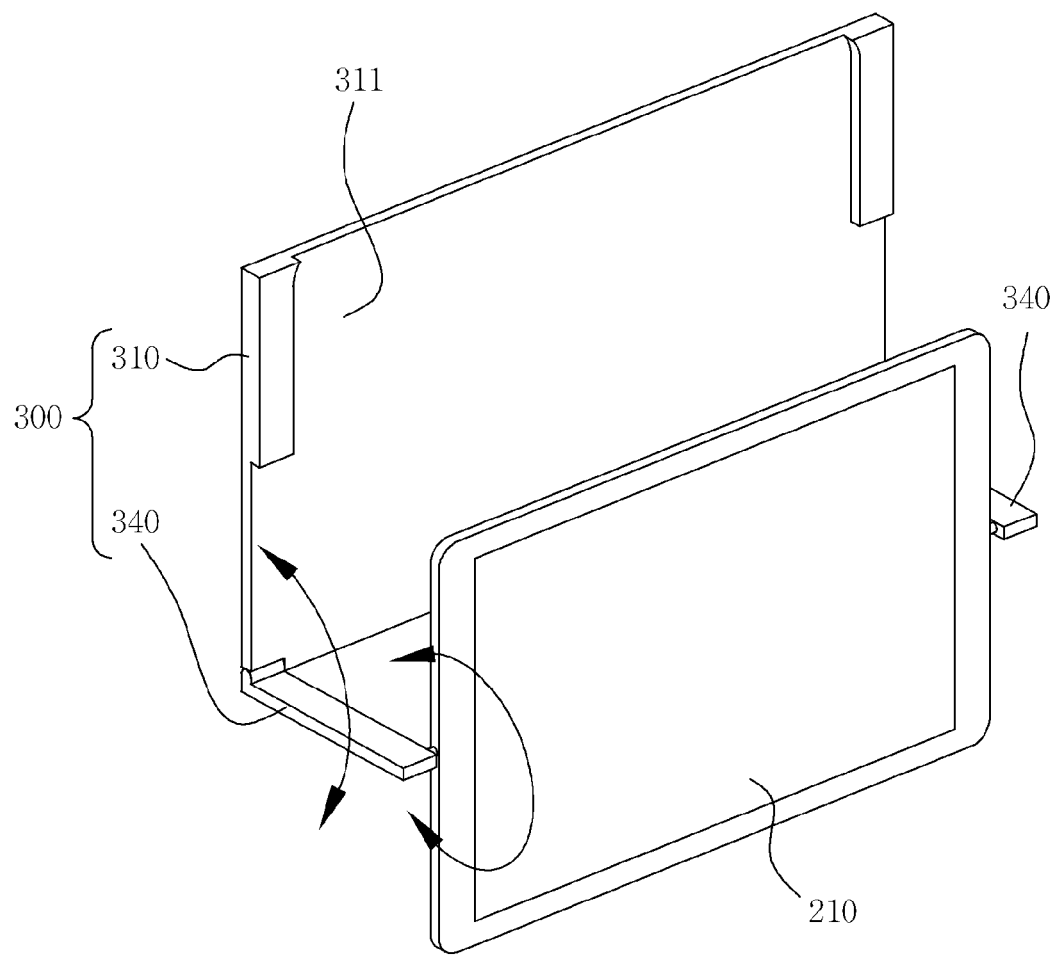
FIG. 4 is a perspective view showing still another embodiment of a terminal holder.
Figure 5:
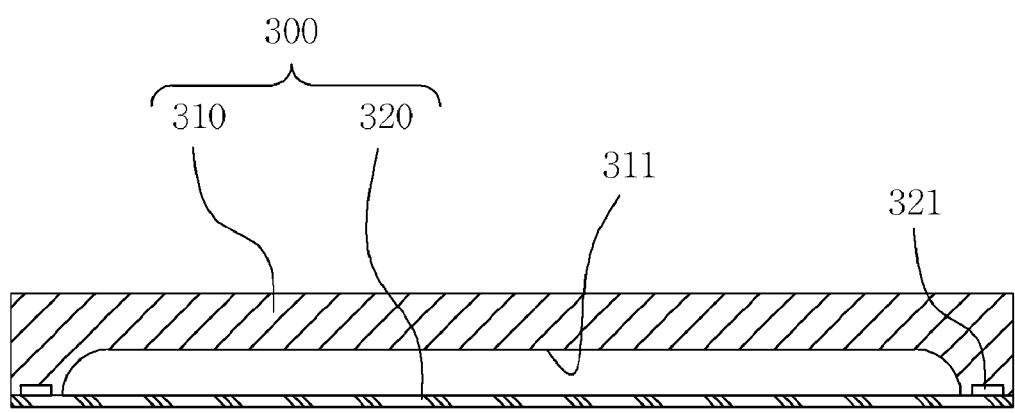
FIG. 5 is a longitudinal sectional view showing a touch cover provided in a terminal holder.
Figure 9:
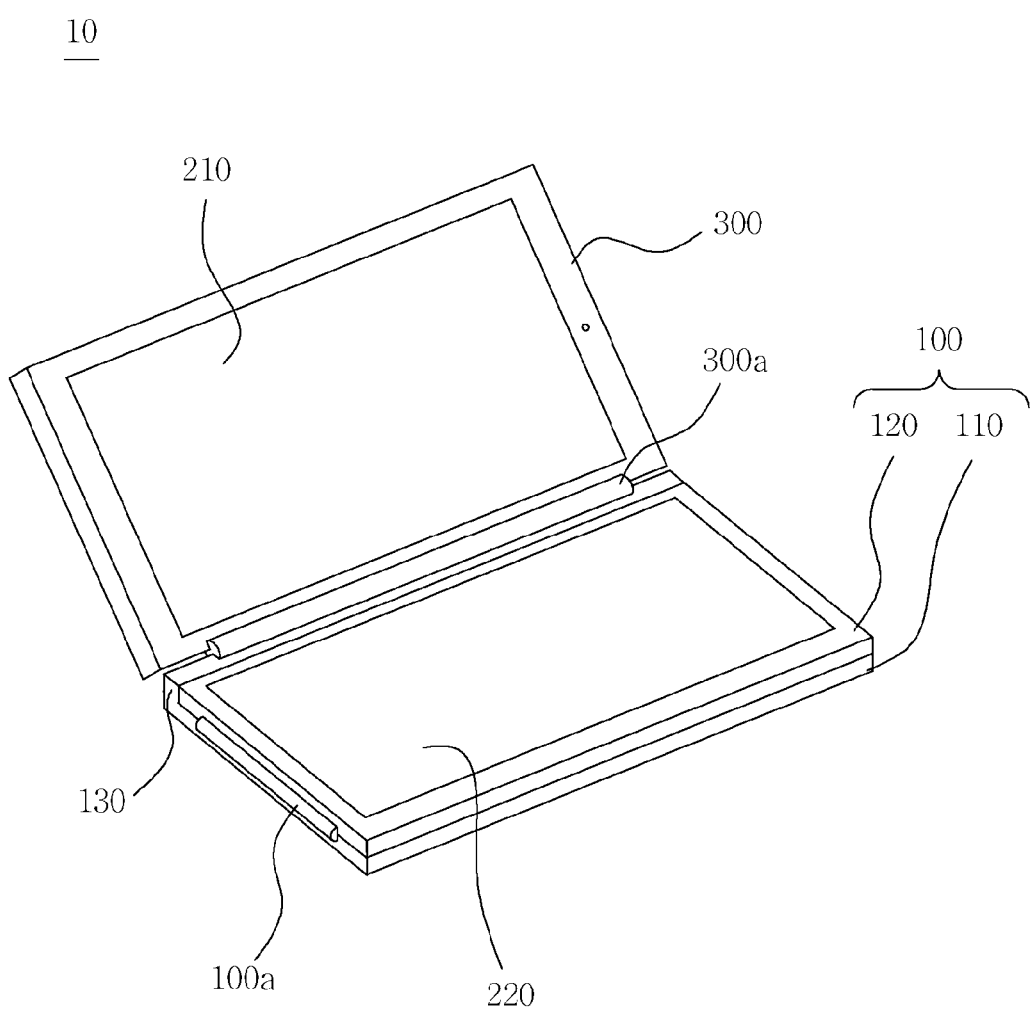
FIG. 9 is a perspective view showing a foldable multimedia terminal according to another embodiment.
Figure 11:
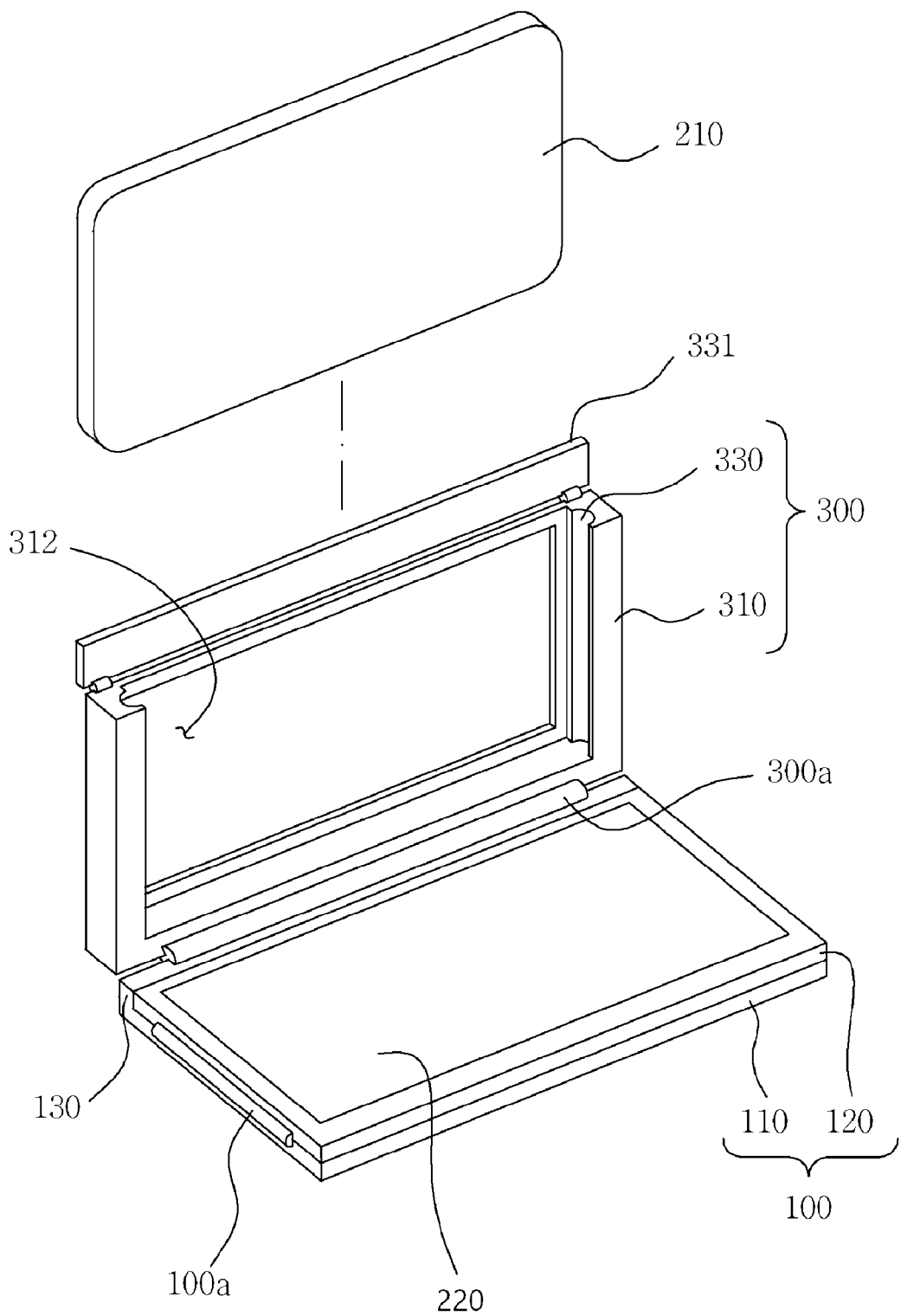
FIGS. 11 and 12 are perspective views showing another embodiment of a mounting panel.
Figure 12:
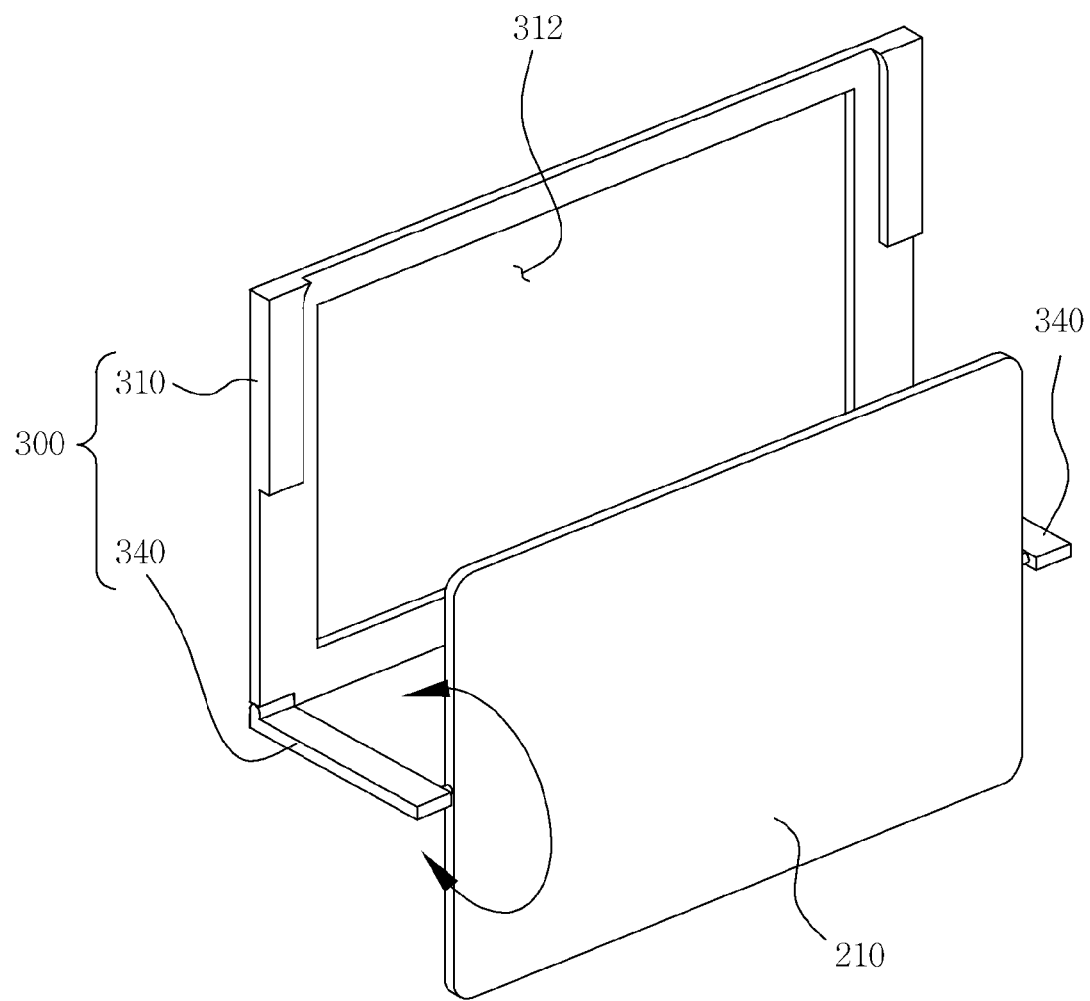
Figure 13:
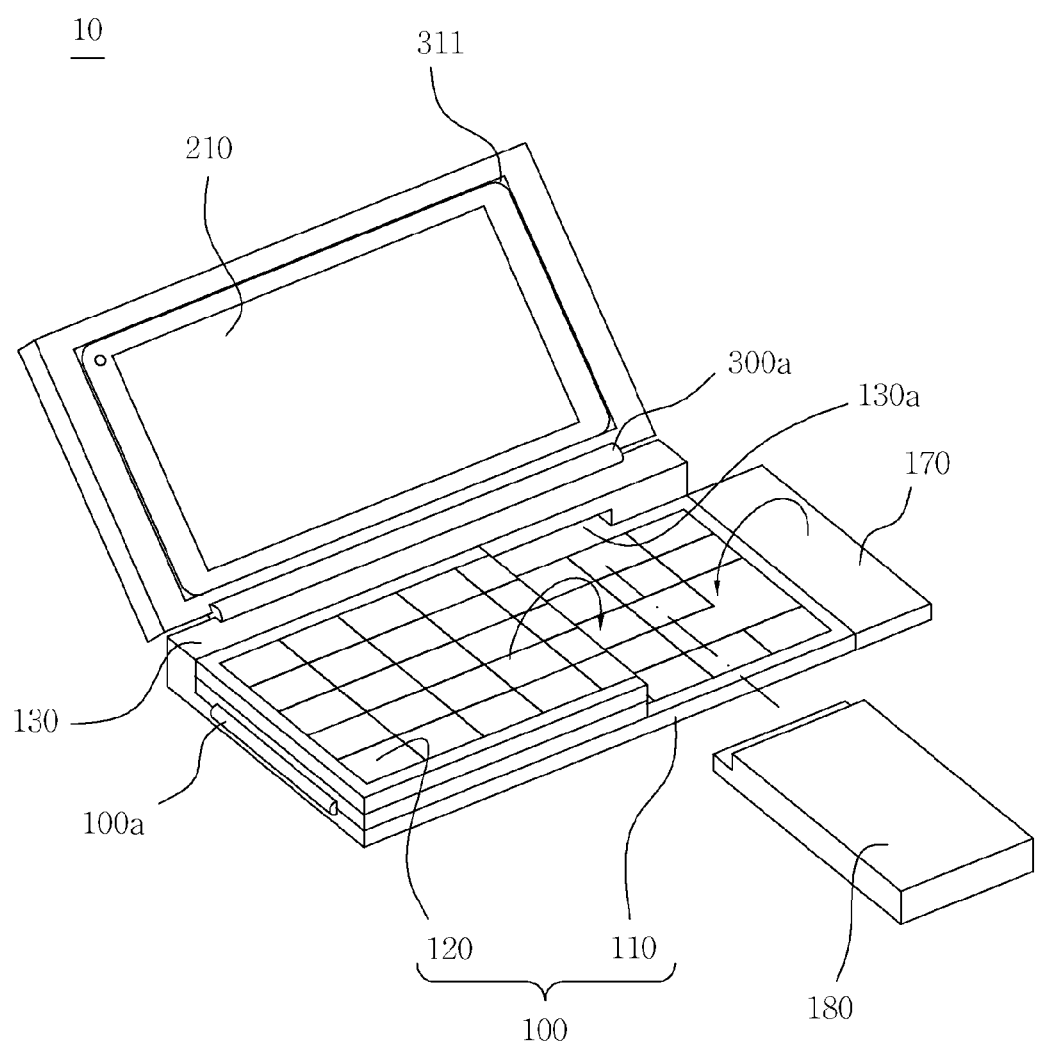
FIG. 13 is a perspective view showing another embodiment of a foldable keyboard.

FIG. 1 is a perspective view showing an unfolded state of a foldable multimedia terminal according to an embodiment, FIG. 2 is a perspective view showing a folded state of a foldable keyboard of a foldable multimedia terminal according to an embodiment, FIG. 3 is a perspective view showing another embodiment of a terminal holder, FIG. 4 is a perspective view showing still another embodiment of a terminal holder, FIG. 5 is a longitudinal sectional view showing a touch cover provided in a terminal holder, FIG. 6 is a rear view showing a keyboard holder provided on the rear surface of the foldable keyboard, FIG. 7 is a longitudinal sectional view showing a folded state of the foldable multimedia terminal according to an embodiment, FIG. 8 is a perspective view showing a folded state of a foldable multimedia terminal according to an embodiment, FIG. 9 is a perspective view showing a foldable multimedia terminal according to another embodiment, FIG. 10 is a perspective view showing a state of use of a foldable multimedia terminal, FIGS. 11 and 12 are perspective views showing another embodiment of a mounting panel, FIG. 13 is a perspective view showing another embodiment of a foldable keyboard, and FIG. 14 is a perspective view showing still another embodiment of a foldable keyboard.

The foldable multimedia terminal 10 according to one embodiment can provide a keyboard input environment or a dual screen through a plurality of terminals, and may include a foldable keyboard 100, a first terminal unit 210, a second terminal unit 220, and a terminal holder 300 as shown in FIGS. 1 and 2.

The foldable keyboard 100 is a component that provides an input environment for a user to the first terminal unit 210 to be described below.

Specifically, as shown in FIG. 1, the foldable keyboard 100 may be divided into one-side keyboard 110 and the other-side keyboard 120 and may be foldably connected by a keyboard hinge 100a.

In addition, the one-side keyboard 110 of the foldable keyboard 100 may be foldably connected to a terminal holder 300 to be described below through a holder hinge 300a.

In this case, the keyboard hinge 100a may have any configuration so long as it is configured in a hinge structure or a flexible band structure that allows the one-side keyboard 110 and the other-side keyboard 120 to be folded, and the folding structure is a component provided therein with a flexible printed circuit board (FPCB) or a cable, which is not shown, capable of transmitting either or both of power and signals.

Accordingly, as shown in FIG. 2, the one-side keyboard 110 and the other-side keyboard 120 of the foldable keyboard 100 may be folded, and, as shown in FIGS. 7 and 8, the first terminal unit 210 to be described below may be folded together through the terminal holder 300 to be described below.

The one-side keyboard 110 and the other-side keyboard 120 of the foldable keyboard 100 may be configured in the same manner as a conventional keyboard.

In addition, the foldable keyboard 100 may be equipped with a battery, which is not shown, or connected to an external power source so as to be operated by power, and may supply power to the second terminal unit 220 to be described below.

Further, the foldable keyboard 100 may be provided with a control module which is not shown and controls the operation of the first terminal unit 210 and the second terminal unit 220, which will be described below, while controlling interworking or communication between devices.

The foldable keyboard 100 may be operated through a control module, which is not shown, and may be used as a keyboard while being connected to another computer, tablet PC, or smart phone.

Meanwhile, the foldable keyboard 100 may be provided with a step130 as shown in FIGS. 1 and 2.

In detail, the step 130 is for providing a mounting portion for the other-side keyboard 120 on the one-side keyboard 110, and has an 'L'-shaped section on the one-side keyboard 110 to accommodate the other-side keyboard 120 when the other-side keyboard 120 is folded.

That is, as shown in FIG. 2, the other-side keyboard 120 may be rested on the step 130 of the one-side keyboard 110 when it is folded so that the one-side keyboard 110 can be folded while being prevented from being shaken.

In addition, as shown in FIG. 7, since the one-side keyboard 110 and the other-side keyboard 120 may precisely overlap each other through the step 130, the foldable keyboard 100 may have a thickness the same as that of the terminal holder 300 to be described below, so that it is possible to allow the terminal holder 300, which will be described below, to be smoothly folded in a state in which the one-side keyboard 110 and the other-side keyboard 120 are folded.

In addition, as shown in FIG. 13, at least one of the one-side keyboard and the other-side keyboard of the foldable keyboard 100 may be dividedly formed to be foldable in multiple stages.

Accordingly, the one-side keyboard 110 and the other-side keyboard 120 of the foldable keyboard 100 may be folded in multiple stages while being folded about the keyboard hinge 100a.

The first terminal unit 210 is a component including a touch display that interworks with the foldable keyboard 100 to make an input by the foldable keyboard 100 or a touch.

The input to the first terminal unit 210 may be realized by the foldable keyboard 100 while the first terminal unit 210 is operated by the above-described control module, and alternatively, the input by the touch of a user may be realized.

In addition, the first terminal unit 210 may provide at least one function of multimedia contents including camera operation, phone calls, Internet communication, and games while being operated by the control module.

Further, the first terminal unit 210 may be configured as a normal smartphone or tablet computer and independently portable by the user, and may be configured as a flat display, a foldable display, a rollable display, a covered display, and a deformable display or a stretchable display.

The first terminal unit 210 may provide contents through a communication module (open type or security type), which may be separately (dividedly) provided in either or both of the first terminal unit 210 and the terminal holder 300, otherwise, may provide the contents through the communication module provided in the above-described control module.

In addition, as shown in FIGS. 1 to 4, the first terminal unit 210 may be separably mounted on the foldable keyboard 100 while being accommodated through the terminal holder 300 to be described below.

Meanwhile, as shown in FIG. 9, the first terminal unit 210 may be integrally formed with the terminal holder 300 to be described below.

In addition, the first terminal unit 210 may interwork with the flexible keyboard 100 through the control module of the foldable keyboard 100 described above to provide an input environment for the foldable keyboard 100 and may be connected to the second terminal unit 220 to be described below in order to interwork with the second terminal unit 220.

The second terminal unit 220 may provide a dual screen together with the first terminal unit 210 while interworking with the first terminal unit 210 or perform a function of the first terminal unit 210 instead of the first terminal unit 210.

Specifically, the second terminal unit 220 is configured as a touch display and may interwork with the first terminal unit 210 by the above-described control module as the input is performed by the touch of user, and as shown in FIG. 2, the second terminal unit 220 may be integrally formed on the rear surface of at least one of the one-side keyboard 110 and the other-side keyboard 120 constituting the foldable keyboard 100.

Alternatively, as shown in FIG. 6, the second terminal unit 220 may be separably accommodated in the keyboard holder 400 provided on the rear surface of the foldable keyboard 100

The second terminal unit 220 may provide the same contents as the first terminal unit 210 while interworking with the first terminal unit 210, and, as shown in FIG. 2, when the foldable keyboard 100 is folded, the second terminal unit 220 may be arranged in parallel with the first terminal unit 210a to provide a dual image together r with the first terminal unit 210.

In addition, the second terminal unit 220 may provide an input environment to the first terminal unit 210 by providing a software keyboard while being connected to the first terminal unit 210.

Further, the second terminal unit 220 may be provided therein with a communication module to perform independent calls or Internet communication. In addition, if the configuration of the communication module is omitted, the second terminal unit 220 is operated under the control of the control module to provide at least one of multimedia contents including camera operation, calls, Internet communication, and games.

In addition, the second terminal unit 220 may be used as a monitor while being connected to another device such as another computer.

As shown in FIG. 6, when the second terminal unit 220 is configured to be separated from the keyboard holder 400, which will be described below, the second terminal unit 220 may be selectively accommodated in any one of the first holder 410 and the second holder 420, or may be accommodated in the terminal holder 300 to be described below.

Specifically, the keyboard holder 400 is a component provided on a rear surface of at least one of the one-side keyboard 110 and the other-side keyboard 120 for separably accommodating the second terminal unit 220, and may include a first holder 410 and a second holder 420.

The first holder 410 may be provided in the form of a groove, a pocket, or a slot on the rear surface of one of the one-side keyboard 110 and the other-side keyboard 120 to accommodate the second terminal unit 220, and the second holder 410 may be provided in the form of a groove, a pocket, or a slot on the rear surface of the remaining one of the one-side keyboard 110 and the other-side keyboard 120 to accommodate the second terminal unit 220.

That is, the second terminal unit 220 may be selectively accommodated in one of the first holder 410 and the second holder 420.

When the second terminal unit 220 is accommodated in the second holder 420, the second terminal unit 220 may be arranged in parallel with the first terminal unit 210 as the foldable keyboard 100 is folded, thereby providing a dual screen together with the first terminal unit 210.

In addition, when the second terminal unit 220 is accommodated in the first holder 420, as shown in FIG. 8, the second terminal unit 220 is disposed on the rear surface of one-side keyboard 110 in a state in which the first terminal unit 210 is folded, thereby performing the function of the first terminal unit 210 instead of the first terminal unit 210.

Meanwhile, the keyboard holder 400 may accommodate the second terminal unit 220 in one of the first holder 410 and the second holder 420, and peripherals devices such as a memory, a cable or a mouse may be accommodated in the remaining one of the first holder 410 and the second holder 420.

In addition, the first holder 410 and the second holder 420 may be shielded and opened or closed by a holder touch cover, which is not shown, so as to enable a touch to the second terminal unit 220.

Specifically, the holder touch cover may be formed of transparent and conductive tempered glass similar to the configuration of the touch cover 320 to be described below, and coupled to the rear surfaces of the one-side keyboard 110 and the other-side keyboard 120 so as to be opened or closed, thereby shielding the first holder 410 and the second holder 420.

Such a holder touch cover may be configured to be opened or closed by means of the above-described keyboard hinge 100a.

That is, one end of the holder touch cover may be connected to the keyboard hinge 100a, and the other end may rotate about the keyboard hinge 100a to open or close the first holder 410 and the second holder 420.

Alternatively, the holder touch cover may be configured to be completely separated from the one-side keyboard 110 and the other-side keyboard 120.

The holder touch cover, the first holder 410, and the second holder 420 may be provided with a locking member such as a magnet or a coupling protrusion so that they can be locked in a closed state.

Accordingly, the second terminal unit 220 may be coupled to the rear surface of the foldable keyboard 100 by the keyboard touch cover, and may be separated from the foldable keyboard 100 for use if necessary.

If the second terminal unit 220 is configured to be separated from the rear surface of the foldable keyboard 100, the second terminal unit 220, instead of the first terminal unit 210, can be selectively mounted on the terminal holder 300 to be described below.

As shown in FIGS. 1 to 4, the terminal holder 300 is a component that provides an accommodation space where one of the first terminal unit 210 and the second terminal unit 220 can be separably accommodated, or as shown in FIG. 8, accommodates the first terminal unit 210 integrally.

For example, the terminal holder 300 separably or integrally accommodates the first terminal unit 210 in a state in which the terminal holder 300 is foldably connected to the one-side keyboard 110 constituting the foldable keyboard 100 through the holder hinge 300a, so that the first terminal unit 210 can be folded with respect to the foldable keyboard 100.

Accordingly, as shown in FIGS. 7 and 8, the first terminal unit 210 can be shielded from the outside by being folded to the foldable keyboard 100 together with the terminal holder 300 so that the first terminal unit 210 can be protected from the external environment.

For example, as shown in FIGS. 1 and 2, the terminal holder 300 may be configured to include a mounting panel 310.

The mounting panel 310 provides a mounting surface for the first terminal unit 210 and is formed in a plate shape as shown in the drawing and foldably connected to the one-side keyboard constituting the foldable keyboard 100 through the holder hinge 300a, so that a mounting groove 311 for mounting the first terminal unit 210 can be formed and the first terminal unit 210 can be mounted in the mounting groove 311.

The mounting panel 310 may be provided on a rear surface thereof with a support, which is not shown, so that the mounting panel 310 can adjust the inclination angle of the first terminal unit 210 while supporting the ground at a preset angle.

Meanwhile, as shown in FIG. 5, the mounting panel 310 may be coupled with the touch cover 320 to shield the first terminal unit 210 such that the first terminal unit 210 can be touched.

The touch cover 320 may be formed of transparent and conductive tempered glass, and separably coupled to the mounting panel 310 to shield the first terminal unit 210 mounted on the mounting panel 310 such that the first terminal unit 210 can be touched.

Accordingly, the first terminal unit 210 may be protected from an external environment by the touch cover 320.

As shown in FIG. 5, the touch cover 320 may be fixed to the mounting panel 310 by a fixing member 321 such as magnets provided on the mounting panel 310 and the touch cover 320, respectively, and may shield the first terminal unit 210 such that the first terminal unit 210 can be touched.

It is also possible to mount the second terminal unit 220 on the mounting panel 310 constituting the terminal holder 300, instead of the first terminal unit 210.

Meanwhile, the terminal holder 300 may further include a mounting slot 330 and a slot cover 331 as shown in FIG. 3.

The mounting slot 330 may be formed in a part of the mounting groove 311 while being opened to accommodate the first terminal unit 210 or the second terminal unit 220 in a slide manner.

That is, the first terminal unit 210 or the second terminal unit 220 may be accommodated in the mounting panel 310 while sliding in the longitudinal direction of the mounting slot 330.

The slot cover 331 may be provided on the mounting panel 310 to shield the mounting slot 330 such that the mounting slot 330 can be opened or closed.

The slot cover 331 may open and close the mounting slot 330 while rotating by a hinge, and alternatively, the slot cover 331 may be configured in a slide type to open or close the mounting slot 330.

Meanwhile, the terminal holder 300 may be configured to include the mounting panel 310 and a connection bar 340 as shown in FIG. 4.

As described above, the mounting panel 310 may be provided with the mounting groove 311, and may be configured without the mounting groove 311.

The connection bar 340 is a component that may be coupled to the first terminal unit 210 or the second terminal unit 220 and allow the rotation of the terminal units 210 and 220 to convert the direction the terminal units 210 and 220 coupled thereto.

Specifically, as shown in FIG. 4, the connection bar 340 may be formed in a bar shape having a predetermined length so that one end thereof is rotatably coupled to both sides of the mounting panel 310, and the first terminal unit 210 or the second terminal unit 220 is rotatably coupled to the other end thereof.

The connection bar 340 may come in close contact with the mounting panel 310 as the other end pivots about the one end, so that the first terminal unit 210 may be mounted on the mounting panel 310.

In addition, the connection bar 340 rotates the first terminal unit 210 or the second terminal unit 220 by standing up to a vertical state with the mounting panel 310 while the other end pivotally rotates around one end.

In addition, an angle adjusting unit (not shown), which adjusts the angle with respect to the mounting panel 310 in multiple stages to maintains a predetermined angle, may be provided on a connection portion between the connection bar 340 and the mounting panel 310 in order to adjust the inclination angle of the first terminal unit 210 or the second terminal unit 220.

Meanwhile, the terminal holder 300 may provide a connection portion for connecting to a separate external display DP as shown in FIG. 10. Meanwhile, the terminal holder 300 may provide a connection portion to be connected to a separate external display DP as shown in FIG. 10.

That is, the terminal holder 300 may be separably inserted and connected to a connection unit DP1 formed on the external display DP to allow the external display DP, the foldable keyboard 100, and the first terminal unit 210 to interwork with each other.

Meanwhile, the holder hinge 300*a* is a component for adjusting an inclination angle of the terminal holder 300 while foldably connecting the mounting panel 310 constituting the terminal holder 300 to the one-side keyboard 110 constituting the foldable keyboard 100.

The holder hinge 300*a*, for example, may have the same configuration as a tilting hinge device applied to a notebook computer, so that the holder hinge 300*a* may adjust the inclination angle of the terminal holder 300 while allowing the terminal holder 300 to be folded or unfolded.

In addition, the holder hinge 300*a* may have any configuration so long as it can adjust the inclination angle of the mounting panel 310 while folding the mounting panel 310 and the one-side keyboard 110.

Meanwhile, unlike the drawings, the terminal holder 300 may be provided on a lateral side of the foldable keyboard 100, or may be provided in the form of a groove or a pocket on the rear surface of the foldable keyboard 100.

That is, the above-described keyboard holder 400 may be an embodiment of the terminal holder 300.

Meanwhile, as shown in FIG. 1, the foldable multimedia terminal 10 according to the preferred embodiment may further include a keyboard folding detection sensor 150.

The keyboard folding detection sensor 150 is a component for automatically operating the second terminal unit 220 when the foldable keyboard 100 is folded.

Specifically, the keyboard folding detection sensor 150 may be configured as a photosensor or an infrared sensor provided on the other-side keyboard 120 to detect the other-side keyboard 120 folded onto the one-side keyboard 110, and may automatically operate the second terminal unit 220 when the other-side keyboard 120 is folded onto the one-side keyboard 110.

That is, the keyboard folding detection sensor 150 automatically operates the second terminal unit 220 when the second terminal unit 220 is arranged in parallel with the first terminal unit 210 to automatically implement the dual screen.

The keyboard folding detection sensor 150 may be provided in the above-described keyboard hinge 100*a*.

In addition, as shown in FIG. 2, the foldable multimedia terminal 10 according to an embodiment may further include a terminal unit folding detection sensor 160.

The terminal unit folding detection sensor 160 is a component for automatically operating the second terminal 220 when the first terminal 210 is folded on the foldable keyboard 100.

Specifically, the terminal unit folding detection sensor 160 may be configured as a photosensor or an infrared sensor provided on the first terminal unit 210 or the terminal holder 300 to detect the first terminal unit 210 folded onto the foldable keyboard 100 together with the terminal holder 300, and may automatically operate the second terminal unit 220 while turning off the first terminal unit 210 when the first terminal unit 210 is folded onto the foldable keyboard 100.

That is, when the first terminal unit 210 is folded, the terminal unit folding detection sensor 160 automatically turns off the screen of the first terminal unit 210 and automatically operates the screen of the second terminal unit 220, so that the second terminal unit 220 accommodated in the first holder 410 may perform the function of the first terminal unit 210 instead of the first terminal unit 210.

Such a terminal unit folding detection sensor 160 may be provided in the above-described holder hinge 300*a*.

Meanwhile, as shown in FIGS. 11 and 12, the above-described mounting panel 310 may have a viewing window 312 formed through the mounting panel 310.

The viewing window 312 allows the first terminal unit 210 mounted on the mounting panel 310 to be viewed from the opposite side, and the viewing window 312 is a hole having a size corresponding to the touch display of the first terminal unit 210 and is formed through the mounting panel 310.

Accordingly, even when the first terminal unit 210 is mounted in a reversed state on the mounting panel 310, the touch display may be exposed through the viewing window 312, so that the first terminal unit 310 may be operated through the rear surface of the mounting panel 310.

In this case, the second terminal unit 220 may be accommodated in the first holder 410 of the keyboard holder 400 to provide a dual screen together with the first terminal unit 210.

Meanwhile, as shown in FIG. 13, the foldable keyboard 100 may be configured to be folded or unfolded as the other-side keyboard 120 is divided.

For example, the other-side keyboard 120 may be divided into two portions that are foldably coupled to each other by a hinge, which is not shown, and may be folded or unfolded while rotating about the hinge.

The length of the other-side keyboard 120 may be longer than the length of the one-side keyboard 110 in the unfolded state. In this case, the other-side keyboard 120 may be provided with additional function keys.

In addition, when the other-side keyboard 120 has the length longer than the length of the one-side keyboard 110 and overlaps the one-side keyboard 110, a problem may occur due to a part of the other-side keyboard 120 protruding out of the one-side keyboard 110.

In order to prevent the above problems, the one-side keyboard 110 may be provided at the end thereof with an expansion plate 170 that is foldably installed by a hinge to extend the length.

As shown in FIG. 13, the expansion plate 170 can extend the length of one-side keyboard 110 while being unfolded to the side of the one-side keyboard 110, and may support a portion of the other-side keyboard 120 when the other-side keyboard 120 is unfolded to the top surface of the one-side keyboard 110.

In addition, when the other-side keyboard 120 is folded, the expansion plate 170 may be folded while rotating to the top surface of the one-side keyboard 110.

Meanwhile, the foldable keyboard 100 may further include a storage case 180 as shown in FIG. 13.

The storage case 180 is a component that separably accommodates the second terminal unit 220 or peripheral devices, and is inserted into a fitting groove 130a formed in the step 130 of the one-side keyboard 110 and disposed between the other-side keyboard 120 and the expansion plate 170.

One side of the storage case 180 is shielded as the expansion plate 170 described above is folded in a state in which the storage case 180 is inserted into the fitting groove 130a, so that it can be prevented from being unintentionally shaken.

Meanwhile, as shown in FIG. 14, the foldable keyboard 100 may have a keyboard formed only on a part of the one-side keyboard 110, and a storage unit 190 for providing a storage space may be provided in the rest of the one-side keyboard 110.

In this case, the other-side keyboard 120 may be configured to have a length corresponding to the keyboard of the one-side keyboard 110, and may be unfolded toward the storage unit 190 while rotating about the keyboard hinge 100a.

The storage unit 190 is configured to accommodate the second terminal 220 or peripheral devices, and may include a storage case 180 and a storage box 192 as shown in FIG. 14.

As described above, the storage case 180 may be fitted into the fitting groove 130a formed in the step 130 of the one-side keyboard 110.

The storage case 180 may be formed with guide grooves 180a in the longitudinal direction so that the storage case 180 may be fitted into the fitting groove 130a while sliding along the keyboard hinge 100a.

The storage box 192 is a component that forms a housing and is integrally formed with the one-side keyboard 110 to provide the storage space, and may be formed adjacent to the storage case 180 while being opened or closed by a lid 192a.

As shown in FIG. 14, the lid 192a may support the other-side keyboard 120 together with the storage box 192 since the lid 192a is deployed while opening the storage box 192.

A method of operating the foldable multimedia terminal 10 according to a preferred embodiment including the above components will be described.

After mounting the first terminal unit 210 on the mounting panel 310, the user can perform the input through the foldable keyboard 100 while maintaining the mounting panel 310 at a predetermined angle in order to use the contents of the terminal unit 210.

When implementing the dual screen, the user folds the other-side keyboard 120 to the one-side keyboard 110.

At this point, the second terminal 220 may be accommodated in the second holder 420 provided on the other-side keyboard 120, and the keyboard folding detection sensor 150 may automatically operate the second terminal unit 500 by detecting the other-side keyboard 120 that is folded to the one-side keyboard 110.

Accordingly, the user can use the contents through the dual screen provided by the first terminal unit 210 and the second terminal unit 220.

When the use of the first terminal unit 210 is terminated, the user folds the first terminal unit 210 onto the foldable keyboard 100.

At this point, the second terminal unit 220 may be accommodated in the first holder 410 provided on the one-side keyboard 110, and the terminal unit folding detection sensor 160 may automatically operate the screen of the second terminal 220 while turning off the screen of the first terminal unit 210 by detecting the first terminal 210 being folded.

As described above, the user can use the foldable multimedia terminal 10 according to the preferred embodiment by easily mounting the first terminal unit 210 on the terminal holder 300, and the input environment can be provided through the foldable keyboard 100 or various contents can be provided through the second terminal unit 220.

An open communication module which can perform wireless communication through a communication module including at least one of Zigbee, Low Energy Bluetooth (BLE), Bluetooth, Wi-Fi, 3G (3rd Generation), 3GPP (3rd Generation Partnership Project), LTE (Long Term Evolution), LTE-A, 4G (4th Generation), and 5G(5th Generation) and can be configured to execute only the open type contents while filtering transmitted/received data may be separately (dividedly) provided on either or both of the first terminal unit 210 and the terminal holder 300, and the open function unit OF may be configured to include the first terminal unit 210 and the terminal holder 300. In addition, since the open communication module is installed, only the open type contents can be provided through a touch display of one of the first terminal unit 210 and the second terminal unit 220 or an external display (DP).

Such an open communication module can be implemented as a hardware circuit together with the above-described wireless communication module to filter the open type contents. Alternatively, it can be implemented as a software program and only the open type contents including at least one of contents, such as games, Internet surfing, dynamic picture playback and music playback, which do not require a high level of security, can be executed.

The open type contents may include any contents provided by a web browser during the Internet surfing process.

For example, the payment window for e-commerce or the approval window for mobile banking provided during the Internet surfing process may be included in the open type contents, and the user authentication for e-commerce payment or the user authentication for mobile banking approval may be included in the security type content.

In addition, a security communication module which can perform the wireless communication through a communication module including at least one of Zigbee, Low Energy Bluetooth (BLE), Bluetooth, Wi-Fi, 3G (3rd Generation), 3GPP (3rd Generation Partnership Project), LTE(Long Term Evolution), LTE-A, 4G(4th Generation), and 5G(5th Generation), or can be configured to execute only the security type contents while filtering transmitted/received data may be separately (dividedly) provided on either or both of the rear surface of the foldable keyboard 100 and the terminal holder 300, in which some channels of a specific bandwidth among all communication channels configured in the above-described open communication module may be connected to the security communication module (hardware circuit) using a wired cable as a connection medium, and may be allocated as a dedicated security communication channel. In addition, the security function unit (SF) may be provided on the rear surface of the foldable keyboard or the rear surface of the first terminal unit 210 constituting the open function unit (OF) and it is possible to provide only the security type contents by installing the security communication module.

Such a security communication module can be implemented as a hardware circuit together with the above-described wireless communication module to filter the security type contents. Alternatively, it can be implemented as a software program, and only the security type contents including at least one of contents, such voice call, video call, mobile messenger and user authentication for e-commerce and mobile banking, which require a relatively high level of security, can be executed.

In addition, an interworking control unit, which is a component for interworking the open communication module of the open function unit (OF) with the security communication module of the security function unit (SF) described above by means of the holder hinge 300*a* and the keyboard hinge 100*a*, may be included.

Specifically, the interworking control unit may be implemented as a hardware circuit or software program provided in the open function unit (OF) or the security function unit (SF). When a security type content is requested to the open function unit (OF) during the execution of the open type contents, the requested security type contents can be approved by executing the requested security type contents in the security function unit (SF).

For example, when a user authentication for electronic payment or a user authentication for mobile banking is requested during the Internet surfing process by the open function unit (OF), the interworking control unit authenticates and approves the request by executing the request in the security function unit (SF).

The above-described embodiments are for illustrative purposes only, and it can be understood that those skilled in the art to which the above-described embodiments pertain can easily modify the embodiments into other specific forms without changing the technical idea or essential features of the above-described embodiments.

Therefore, it should be understood that the above-described embodiments are illustrative and non-limiting in all respects. For example, each component described as an integral type may be implemented as a discrete type, and similarly, components described as a discrete type may also be implemented as an integral type.

The scope to be protected through this specification is represented by the claims to be described below rather than the detailed description, and includes all changes or modified forms derived from the meaning and scope of the claims and the concept of equivalents thereof.

The invention claimed is:

1. A foldable multimedia terminal comprising:
a foldable keyboard having one-side keyboard and an other-side keyboard foldably connected to the one-side keyboard such that a user performs an input;
a first terminal unit including a touch display so as to allow an input to be carried out by means of the foldable keyboard or by means of touch, while interworking with the foldable keyboard, and which performs at least one from among calling, Internet communication, and multimedia content functions;
a second terminal unit which is provided so as to be integrated with or separated from a rear surface of at least one of the one-side keyboard and the other-side keyboard constituting the foldable keyboard, and which provides a dual screen together with the first terminal unit or takes over a function of the first terminal unit while interworking with the first terminal unit;
a terminal holder which is provided on the foldable keyboard so as to accommodate the first terminal unit or which accommodates one of the first terminal unit and the second terminal unit when the second terminal unit is separably provided on the foldable keyboard; and
a keyboard holder provided on a rear surface of at least one of the one-side keyboard and the other-side keyboard constituting the foldable keyboard to separably accommodate the second terminal unit.

2. A foldable multimedia terminal comprising:
a foldable keyboard having one-side keyboard and an other-side keyboard foldably connected to the one-side keyboard such that a user performs an input;
a first terminal unit including a touch display so as to allow an input to be carried out by means of the foldable keyboard or by means of touch, while interworking with the foldable keyboard, and which performs at least one from calling, Internet communication, and multimedia content functions;
a second terminal unit which is provided so as to be integrated with or separated from a rear surface of at least one of the one-side keyboard and the other-side keyboard constituting the foldable keyboard, and which provides a dual screen together with the first terminal unit or takes over a function of the first terminal unit while interworking with the first terminal unit;
a terminal holder foldably provided on the foldable keyboard and integrally formed with the first terminal unit such that the terminal holder is unfolded or folded on the foldable keyboard together with the first terminal unit; and
a keyboard holder provided on a rear surface of at least one of the one-side keyboard and the other-side keyboard constituting the foldable keyboard to separably accommodate the second terminal unit.

3. The foldable multimedia terminal of claim 1, wherein the terminal holder includes a mounting panel that is foldably connected to the foldable keyboard so as to be unfolded or folded on the foldable keyboard and has a mounting groove in which one of the first terminal unit and the second terminal unit is mounted.

4. The foldable multimedia terminal of claim 3, wherein the terminal holder further includes a touch cover that is coupled to the mounting panel to shield the terminal unit mounted in the mounting groove while allowing the terminal unit to be touchable.

5. The foldable multimedia terminal of claim 3, wherein the terminal holder further includes a mounting slot formed in a part of the mounting groove constituting the mounting panel while being opened to accommodate one of the first terminal unit and the second terminal unit in a slide manner.

6. The foldable multimedia terminal of claim 5, wherein the terminal holder further includes a slot cover for shielding an opening of the mounting slot such that the opening of the mounting slot is opened or closed.

7. The foldable multimedia terminal of claim 3, wherein the terminal holder includes a connection bar configured as a pair of bars having a predetermined length, in which one ends of the bars are rotatably coupled to both sides of the mounting panel, respectively, so that opposite ends of the bars are in close contact with the mounting panel or stand vertically with respect to the mounting panel while pivoting about the one ends, and one of the first terminal unit and the second terminal unit is rotatably coupled to the opposite end so that the coupled terminal unit is in close contact with the mounting panel or rotated while standing on the mounting panel.

8. The foldable multimedia terminal of claim 1, wherein the keyboard holder includes: a first holder provided on a rear surface of one of the one-side keyboard and the other-side keyboard to separably accommodate the second terminal unit; and a second holder provided on a rear surface of a remaining one of the one-side keyboard and the other-side keyboard to selectively accommodate the second terminal unit together with the first holder.

9. The foldable multimedia terminal of claim 8, wherein one of the first holder and the second holder of the keyboard holder separably accommodates the second terminal unit, and a remaining one of the first holder and the second holder of the keyboard holder separably accommodates a peripheral device.

10. The foldable multimedia terminal of claim 8, wherein the keyboard holder further includes a holder touch cover that allows a touch to the second terminal unit while shielding the first holder and the second holder so as to be opened and closed, respectively.

11. The foldable multimedia terminal of claim 1, wherein the foldable keyboard includes a step formed on the one-side keyboard to provide a mounting portion for the other-side keyboard when the other-side keyboard is folded.

12. The foldable multimedia terminal of claim 1, further comprising: a keyboard folding detection sensor provided on one of the one-side keyboard and the other-side keyboard constituting the foldable keyboard to detect that the foldable keyboard being folded.

13. The foldable multimedia terminal of claim 1, further comprising: a terminal unit folding detection sensor provided in the first terminal unit or the terminal holder to detect the first terminal unit being folded to the foldable keyboard together with the terminal holder.

14. The foldable multimedia terminal of claim 1, wherein at least one of the one-side keyboard and the other-side keyboard of the foldable keyboard is dividedly formed to be foldable and folded in multiple stages.

15. The foldable multimedia terminal of claim 14, wherein the other-side keyboard of the foldable keyboard is dividedly formed to be foldable with a length longer than a length of the one-side keyboard, and the foldable keyboard further includes an expansion plate foldably coupled to an end of the one-side keyboard and unfolded to extend the length of the one-side keyboard.

16. The foldable multimedia terminal of claim 15, wherein the foldable keyboard further includes a storage case that is separably coupled to the one-side keyboard and interposed between the other-side keyboard and the expansion plate to provide a storage space.

17. The foldable multimedia terminal of claim 1, wherein a keyboard portion is formed on a part of the one-side keyboard of the foldable keyboard, the other-side keyboard is configured to have a length corresponding to the keyboard portion of the one-side keyboard and spread to a rest portion of the one-side keyboard, and the foldable keyboard further includes a storage unit formed on the rest portion of the one-side keyboard to provide a storage space, in which the storage unit includes: a storage case that is separably coupled to the one-side keyboard to provide the storage space; and a storage box formed adjacent the storage case, integrated with the one-side keyboard to provide the storage space, and opened or closed by a lid.

18. The foldable multimedia terminal of claim 1, wherein the terminal holder is separably inserted into a connection portion provided in an external display to allow the foldable keyboard and the first terminal unit to interwork with the external display.

19. A foldable multimedia terminal comprising:
a foldable keyboard having one-side keyboard and an other-side keyboard foldably connected to the one-side keyboard such that a user performs an input;
a first terminal unit including a touch display so as to allow an input to be carried out by, means of the foldable keyboard or by means of touch, while interworking with the foldable keyboard, and which performs at least one from among calling, Internet communication, and multimedia content functions;
a second terminal unit which is provided so as to be integrated with or separated from a rear surface of at least one of the one-side keyboard and the other-side keyboard constituting the foldable keyboard, and which provides a dual screen together with the first terminal unit or takes over a function of the first terminal unit while interworking with the first terminal unit;
a terminal holder which is provided on the foldable keyboard so as to accommodate the first terminal unit or which accommodates one of the first terminal unit and the second terminal unit when the second terminal unit is separably provided on the foldable keyboard;
an open function unit configured to provide contents and equipped with an open communication module allowing execution of only open type contents including Internet surfing and games;
a security function unit configured to provide security type contents and equipped with a security communication module allowing execution of only security type contents including a call, a messenger and a user authentication; and
a keyboard holder provided on a rear surface of at least one of the one-side keyboard and the other-side keyboard constituting the foldable keyboard to separably accommodate the second terminal unit.

20. A foldable multimedia terminal comprising:
a foldable keyboard having one-side keyboard and an other-side keyboard foldably connected to the one-side keyboard such that a user performs an input;
a first terminal unit including a touch display so as to allow an input to be carried out by means of the foldable keyboard or by means of touch, while interworking with the foldable keyboard, and which performs at least one from among calling, Internet communication, multimedia content functions;
a second terminal unit which is provided so as to be integrated with or separated from a rear surface of at least one of the one-side keyboard and the other-side keyboard constituting the foldable keyboard, and which provides a dual screen together with the first terminal unit or takes over a function of the first terminal unit while interworking with the first terminal unit;

a terminal holder foldably provided on the foldable keyboard and integrally formed with the first terminal unit such that the terminal holder is unfolded or folded on the foldable keyboard together with the first terminal unit;

an open function unit configured to provide contents and equipped with an open communication module allowing execution of only open type contents including Internet surfing and games;

a security function unit configured to provide security type contents and equipped with a security communication module allowing execution of only security type contents including a call, a messenger and a user authentication; and a keyboard holder provided on a rear surface of at least one of the one-side keyboard and the other-side keyboard constituting the foldable keyboard to separably accommodate the second terminal unit.

* * * * *